(12) United States Patent
Aiba et al.

(10) Patent No.: US 9,277,543 B2
(45) Date of Patent: Mar. 1, 2016

(54) MOBILE COMMUNICATION SYSTEM, BASE STATION DEVICE, MOBILE STATION DEVICE, COMMUNICATION METHOD, AND INTEGRATED CIRCUIT

(71) Applicant: Sharp Kabushiki Kaisha, Osaka-shi, Osaka (JP)

(72) Inventors: Tatsushi Aiba, Osaka (JP); Shoichi Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 60 days.

(21) Appl. No.: 14/366,040

(22) PCT Filed: Dec. 18, 2012

(86) PCT No.: PCT/JP2012/082726
§ 371 (c)(1),
(2) Date: Jun. 17, 2014

(87) PCT Pub. No.: WO2013/094578
PCT Pub. Date: Jun. 27, 2013

(65) Prior Publication Data
US 2014/0362797 A1 Dec. 11, 2014

(30) Foreign Application Priority Data

Dec. 19, 2011 (JP) ................................. 2011-276816

(51) Int. Cl.
*H04W 4/00* (2009.01)
*H04W 72/04* (2009.01)
*H04L 1/00* (2006.01)
(Continued)

(52) U.S. Cl.
CPC ......... *H04W 72/0406* (2013.01); *H04L 1/0026* (2013.01); *H04L 1/1671* (2013.01); *H04L 1/1861* (2013.01); *H04L 5/0053* (2013.01)

(58) Field of Classification Search
None
See application file for complete search history.

(56) References Cited

U.S. PATENT DOCUMENTS

2012/0033587 A1* 2/2012 Papasakellariou ...... H04J 13/00 370/277
2012/0120817 A1* 5/2012 Khoshnevis .......... H04L 1/0026 370/252

(Continued)

OTHER PUBLICATIONS

Ericsson, "Carrier aggregation in LTE-Advanced", TSG-RAN WG1 #53bis, R1-082468, Warshaw, Poland, Jun. 30-Jul. 4, 2008, 6 pages.

(Continued)

*Primary Examiner* — Otis L Thompson, Jr.
(74) *Attorney, Agent, or Firm* — Keating & Bennett, LLP

(57) ABSTRACT

A mobile communication system, a base station device, a mobile station device, a communication method, and an integrated circuit that each can efficiently transmit HARQ-ACK and/or channel state information are provided.
A mobile station device includes means for receiving a first parameter that is used for instructing whether simultaneous transmission of information relating to HARQ-ACK and channel state information is allowed or not; and means for receiving a second parameter that is used for instructing whether simultaneous transmission of the information relating to HARQ-ACK and the channel state information is allowed or not, and controls a transmission method of the information relating to HARQ-ACK and the channel state information based on the first parameter, the second parameter, and whether or not the information relating to HARQ-ACK corresponds to transmission on a single physical downlink shared channel only on a primary cell.

17 Claims, 7 Drawing Sheets

(51) Int. Cl.
*H04L 1/16* (2006.01)
*H04L 1/18* (2006.01)
*H04L 5/00* (2006.01)

(56) References Cited

U.S. PATENT DOCUMENTS

| | | | | |
|---|---|---|---|---|
| 2012/0210187 | A1* | 8/2012 | Yin | H03M 13/136 714/751 |
| 2013/0039321 | A1* | 2/2013 | Kim | H04W 72/0413 370/329 |
| 2013/0083748 | A1* | 4/2013 | Li | H04L 5/14 370/329 |
| 2013/0117622 | A1* | 5/2013 | Blankenship | H03M 13/136 714/751 |
| 2013/0121271 | A1* | 5/2013 | Chen | H04W 72/02 370/329 |
| 2014/0078942 | A1* | 3/2014 | Noh | H04W 72/0413 370/280 |
| 2014/0078974 | A1* | 3/2014 | Falahati | H04L 5/0055 370/329 |
| 2014/0105141 | A1* | 4/2014 | Noh | H04W 52/04 370/329 |
| 2014/0198701 | A1* | 7/2014 | Ostergaard | H04W 52/0209 370/311 |
| 2014/0286296 | A1* | 9/2014 | Tiirola | H04L 5/001 370/329 |
| 2015/0043470 | A1* | 2/2015 | Hwang | H04W 2/0413 370/329 |
| 2015/0098441 | A1* | 4/2015 | Peng | H04W 72/042 370/330 |
| 2015/0110029 | A1* | 4/2015 | Hwang | H04L 1/0026 370/329 |
| 2015/0215079 | A1* | 7/2015 | Park | H04L 1/1812 370/280 |
| 2015/0223230 | A1* | 8/2015 | Liang | H04L 1/1812 370/329 |

OTHER PUBLICATIONS

Ericsson, "Views on UL control enhancements for CA", TSG-RAN WG1 #67, R1-113671, San Francisco, CA, Nov. 14-18, 2011, 5 pages.

Potevio, "UCI Multiplexing for Simultaneous PUSCH/PUCCH", 3GPP TSG RAN WG1, Meeting #63b, R1-110360, Jan. 17-21, 2011, 3 Pages.

Motorola Mobility, "Periodic CQI/PMI/RI Reporting for CA", 3GPP TSG RAN WG1, Meeting #63bis, R1-110296, Jan. 17-21, 2011, pp. 1-4.

* cited by examiner

FIG. 7

| FIRST PARAMETER (simultaneousAckNackAndCSI) | FALSE | TRUE | FALSE | TRUE |
|---|---|---|---|---|
| SECOND PARAMETER (simultaneousAckNackAndCSI_v11) | FALSE | FALSE | TRUE | TRUE |
| | ⇨ | ⇨ | ⇨ | ⇨ |
| HARQ-ACK corresponds to a PDSCH transmission only on the primary cell | HARQ-ACK transmission using format 1a/1b (CSI on PUSCH) | HARQ-ACK transmission using format 1a/1b (CSI on PUSCH) | HARQ-ACK transmission using format 1a/1b (CSI on PUSCH) | HARQ-ACK transmission using format 1a/1b (CSI on PUSCH) |
| HARQ-ACK corresponding to a PDSCH transmission on the secondary cell | HARQ-ACK transmission using format 3 (CSI on PUSCH) | HARQ-ACK transmission using format 3 (CSI on PUSCH) | HARQ-ACK + CSI transmission using format 3 | HARQ-ACK + CSI transmission using format 3 |

MOBILE COMMUNICATION SYSTEM, BASE STATION DEVICE, MOBILE STATION DEVICE, COMMUNICATION METHOD, AND INTEGRATED CIRCUIT

TECHNICAL FIELD

The present invention relates to a mobile communication system, a base station device, a mobile station device, a communication method, and an integrated circuit.

BACKGROUND ART

Evolution of a radio access method and a radio network in cellular mobile communication (hereinafter, also called LTE: Long Term Evolution or EUTRA: Evolved Universal Terrestrial Radio Access) is being studied by 3rd Generation Partnership Project (3GPP). In LTE, an OFDM (Orthogonal Frequency Division Multiplexing) system, being multi-carrier transmission, is used as a downlink communication method from a base station device to a mobile station device. Also, a SC-FDMA (Single-Carrier Frequency Division Multiple Access) system, being single-carrier transmission, is used as an uplink communication method from the mobile station device to the base station device. Herein, in LTE, the base station device is also called eNodeB (evolved NodeB), and the mobile station device is also called UE (User Equipment).

Also, in LTE Release 10, a technology is being studied that uses multiple serving cells having the same channel structure as those of LTE Release 8/Release 9 and that performs communication between a base station device and a mobile station device (also called cell aggregation, carrier aggregation) (NPL 1). For example, the base station device and the mobile station device perform transmission and reception of information on multiple aggregated serving cells, in the same sub-frame, on multiple physical channels.

Further, in LTE Release 11, a technology is being studied that, when communication is made by using cell aggregation, a mobile station device transmits control information on HARQ (Hybrid Automatic Repeat Request) (hereinafter, also written as HARQ-ACK) and channel state information (CSI) by using a single physical uplink control channel (PUCCH) (NPL 2).

Herein, HARQ-ACK includes information indicative of ACK/NACK (Positive Acknowledgement/Negative Acknowledgement) for a downlink transport block. Also, HARQ-ACK includes information indicative of DTX (Discontinuous Transmission). Herein, DTX includes information indicative of that a mobile station device could not detect PDCCH and/or PDSCH.

CITATION LIST

Non Patent Literature

NPL 1: "Carrier aggregation in LTE-Advanced," 3GPP TSG-RAN WG1 #53bis, R1-082468, Jun. 30-Jul. 4, 2008

NPL 2: "Views on UL control enhancements for CA," 3GPP TSG-RAN WG1 #67, R1-113671, Nov. 14-18, 2011

SUMMARY OF INVENTION

Technical Problem

However, related art has not provided specific description for the process when the mobile station device transmits HARQ-ACK and/or CSI. That is, related art has not described about the way of setting made by the base station device for the mobile station device, or the way of transmitting HARQ-ACK and/or CSI by the mobile station device.

The present invention is made in light of the situations, and provides a mobile communication system, a base station device, a mobile station device, a communication method, and an integrated circuit that each can efficiently transmit HARQ-ACK and/or CSI.

Solution to Problem (1) To attain the above-described object, the present invention provides means as follows. In particular, there is provided a mobile station device that communicates with a base station device, including means for receiving a first parameter that is used for instructing whether simultaneous transmission of information relating to HARQ-ACK and channel state information is allowed or not; means for receiving a second parameter that is used for instructing whether simultaneous transmission of the information relating to HARQ-ACK and the channel state information is allowed or not; and in a case that the information relating to HARQ-ACK and the channel state information collide with each other in a sub-frame that is not transmitted on a physical uplink shared channel, based on the first parameter, the second parameter, and whether or not the information relating to HARQ-ACK corresponds to transmission on a single physical downlink shared channel only on a primary cell, means for determining whether the channel state information, which is multiplexed with the information relating to HARQ-ACK, is transmitted by using a first physical uplink control channel format, the channel state information, which is multiplexed with the information relating to HARQ-ACK, is transmitted by using a second physical uplink control channel format, or the channel state information is dropped.

(2) Also, in the case that the information relating to HARQ-ACK and the channel state information collide with each other in a sub-frame that is not transmitted on the physical uplink shared channel, if simultaneous transmission of the information relating to HARQ-ACK and the channel state information is allowed by the first parameter, and if the information relating to HARQ-ACK corresponds to transmission on a single physical downlink shared channel only on the primary cell, the channel state information, which is multiplexed with the information relating to HARQ-ACK, is transmitted by using the first physical uplink control channel format.

(3) Also, in the case that the information relating to HARQ-ACK and the channel state information collide with each other in a sub-frame that is not transmitted on the physical uplink shared channel, if simultaneous transmission of the information relating to HARQ-ACK and the channel state information is allowed by the second parameter, and if the information relating to HARQ-ACK corresponds to transmission on a single physical downlink shared channel on at least a single secondary cell, the channel state information, which is multiplexed with the information relating to HARQ-ACK, is transmitted by using the second physical uplink control channel format.

(4) Also, in the case that the information relating to HARQ-ACK and the channel state information collide with each other in a sub-frame that is not transmitted on the physical uplink shared channel, and if simultaneous transmission of the information relating to HARQ-ACK and the channel state information is not allowed by the first parameter, and if simultaneous transmission of the information relating to HARQ- ACK and the channel state information is not allowed by the second parameter, the channel state information is dropped.

(5) Also, a resource for the first physical uplink control information format is set by a higher layer.

(6) Also, a resource for the second physical uplink control information format is instructed from four resources set by a higher layer by using downlink control information that is transmitted on a physical downlink control channel.

(7) Also, the information relating to HARQ-ACK includes information indicative of ACK/NACK.

(8) Also, the channel state information includes channel state information that is periodically transmitted.

(9) Also, there is provided a method of a mobile station device that communicates with a base station device, including receiving a first parameter that is used for instructing whether simultaneous transmission of information relating to HARQ-ACK and channel state information is allowed or not; receiving a second parameter that is used for instructing whether simultaneous transmission of the information relating to HARQ-ACK and the channel state information is allowed or not; and in a case that the information relating to HARQ-ACK and the channel state information collide with each other in a sub-frame that is not transmitted on a physical uplink shared channel, based on the first parameter, the second parameter, and whether or not the information relating to HARQ-ACK corresponds to transmission on a single physical downlink shared channel only on a primary cell, determining whether the channel state information, which is multiplexed with the information relating to HARQ-ACK, is transmitted by using a first physical uplink control channel format, the channel state information, which is multiplexed with the information relating to HARQ-ACK, is transmitted by using a second physical uplink control channel format, or the channel state information is dropped.

(10) Also, there is provided an integrated circuit that is mounted on a mobile station device, which communicates with a base station device, and that causes the mobile station device to execute processing, the processing including processing of receiving a first parameter that is used for instructing whether simultaneous transmission of information relating to HARQ-ACK and channel state information is allowed or not; processing of receiving a second parameter that is used for instructing whether simultaneous transmission of the information relating to HARQ-ACK and the channel state information is allowed or not; and in a case that the information relating to HARQ-ACK and the channel state information collide with each other in a sub-frame that is not transmitted on a physical uplink shared channel, based on the first parameter, the second parameter, and whether or not the information relating to HARQ-ACK corresponds to transmission on a single physical downlink shared channel only on a primary cell, processing of determining whether the channel state information, which is multiplexed with the information relating to HARQ-ACK, is transmitted by using a first physical uplink control channel format, the channel state information, which is multiplexed with the information relating to HARQ-ACK, is transmitted by using a second physical uplink control channel format, or the channel state information is dropped.

Advantageous Effects of Invention

With the present invention, HARQ-ACK and/or channel state information can be efficiently transmitted.

BRIEF DESCRIPTION OF DRAWINGS

FIG. 7 is still another illustration explaining this embodiment.

DESCRIPTION OF EMBODIMENTS

Figure 1:
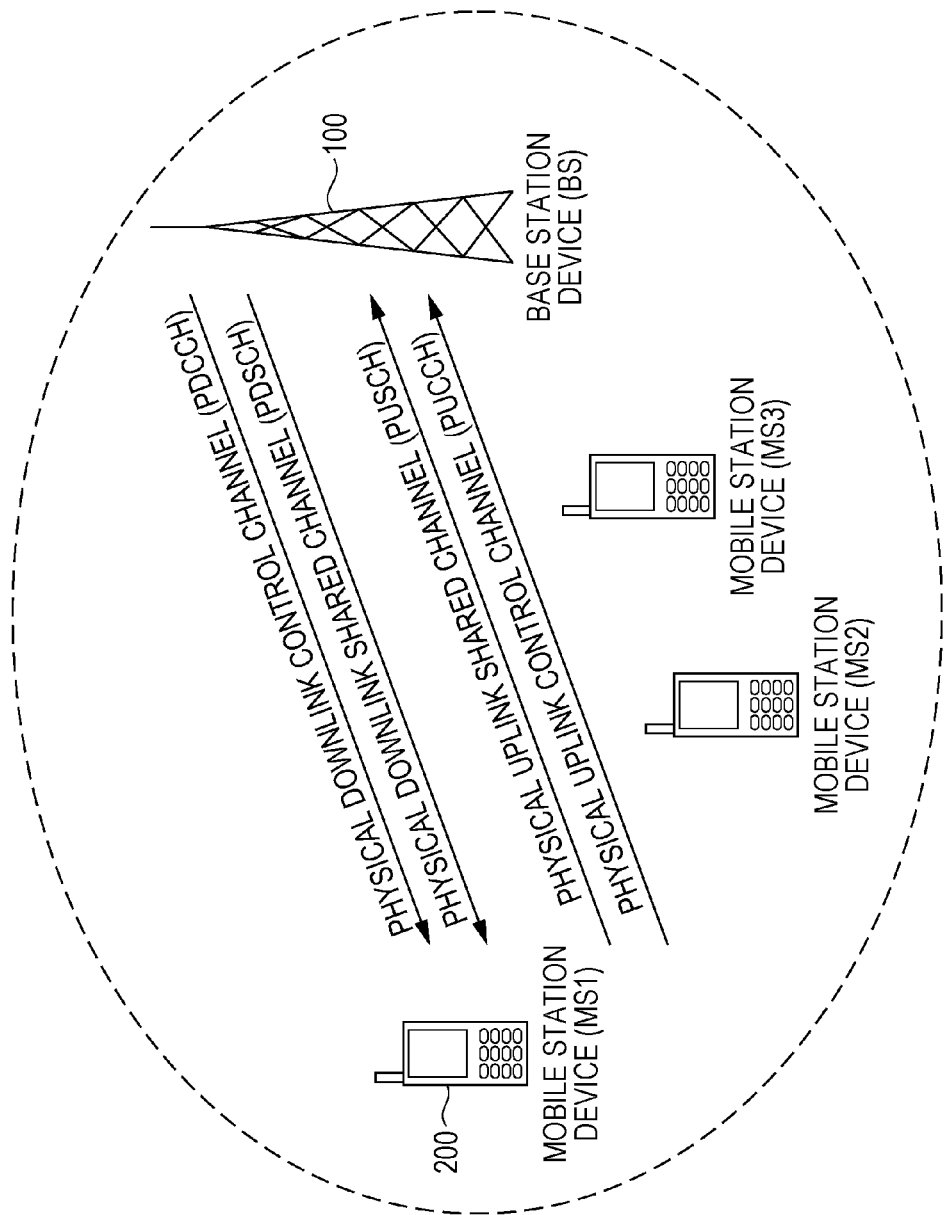
FIG. 1 is a conceptual illustration showing a physical channel configuration according to this embodiment.

An embodiment according to the present invention is described next with reference to the drawings. FIG. 1 is an illustration showing an example of a physical channel configuration according to this embodiment. A physical channel is allocated on a physical resource block that is defined by time domain/frequency domain.

As shown in FIG. 1, downlink physical channels include Physical Downlink Control Channel (PDCCH), Physical Downlink Shared Channel (PDSCH), etc. Also, uplink physical channels include Physical Uplink Shared Channel (PDSCH), Physical Uplink Control Channel (PUCCH), etc.

Herein, PDCCH is a physical channel used for transmitting (notifying, designating) Downlink Control Information (DCI), such as downlink scheduling information (downlink assignment) and uplink scheduling information (uplink grant). Herein, PDCCH may be multiplexed with PDSCH by TDM (Time Division Multiplexing). Alternatively, PDCCH may be multiplexed with PDSCH by FDM (Frequency Division Multiplexing). For example, PDCCH multiplexed with PDSCH by FDM is also called E-PDCCH (Enhanced-PDCCH); however, hereinafter, PDCCH includes E-PDCCH.

Also, when the downlink control information is transmitted, multiple formats are defined. Herein, the format that is used for transmission of the downlink control information is also called DCI format (Downlink Control Information format).

For example, a DCI format 1 is used for scheduling a single PDSCH on a single downlink cell in a single-antenna port transmission mode. Also, a DCI format 2 is used for scheduling a single PDSCH on a single downlink cell in a multi-antenna port mode. That is, the DCI format 1 and the DCI format 2 are downlink assignments used for scheduling PDSCH.

That is, for example, in the DCI format 1 and the DCI format 2, an information field (also called field that is mapped to information bit), such as Resource block assignment for PDSCH and Modulation and Coding Scheme (MCS) for PDSCH (downlink transport block that is transmitted on PDSCH, is defined. Herein, a single downlink assignment includes scheduling information for a single PDSCH on a cell.

Also, for example, a DCI format 0 is used for scheduling a single PDSCH on a single uplink cell in the single-antenna port transmission mode. Also, a DCI format 4 is used for scheduling a single PUSCH on a single uplink cell in the multi-antenna port mode. That is, the DCI format 0 and the DCI format 4 are uplink grants used for scheduling PUSCH.

That is, for example, in the DCI format 0 and the DCI format 4, an information field, such as Resource block assignment for PUSCH and Modulation and Coding Scheme (MCS) for PUSCH (uplink transport block that is transmitted on PUSCH), is defined. Herein, a single uplink assignment includes scheduling information for a single PUSCH on a cell.

If a mobile station device receives resource assignment of PDSCH on PDCCH to the mobile station device, the mobile station device uses PDSCH according to the instructed resource assignment, and receives a downlink signal (transport block for downlink data (Downlink Shared Channel (DL-SCH))) by using PDSCH.

Also, if the mobile station device receives resource assignment of PUSCH on PDCCH to the device, the mobile station device uses PUSCH according to the instructed resource assignment, and transmits an uplink signal (transport block for uplink data (Uplink Shared Channel (UL-SCH))) and/or uplink control data (uplink control information) by using PUSCH.

Also, PDSCH is a channel that is used for transmitting downlink data (transport block for downlink shared channel (DL-SCH)) or paging information (transport block for Paging Channel (PCH)). A base station device transmits downlink data to the mobile station device by PDSCH assigned by using PDCCH.

Herein, downlink data represents, for example, user data, and DL-SCH is a transport channel. Herein, a downlink transport block is a unit used in a MAC (Medium Access Control) layer. Also, the downlink transport block is associated with a cord word in a Physical layer. That is, the downlink transport block is a unit of data that is delivered from the MAC layer to the physical layer.

Further, PUSCH is a physical channel that is mainly used for transmitting uplink data (transport block for uplink shared channel (UL-SCH)). The mobile station device transmits uplink data to the base station device on PUSCH assigned by using PDCCH. Also, if the base station device schedules PUSCH (PUSCH resource) for the mobile station device, Uplink Control Information (UCI) is also transmitted by using PUSCH.

Herein, uplink data represents, for example, user data, and UL-SCH is a transport channel. Herein, an uplink transport block is a unit used in the MAC layer. Also, the uplink transport block is associated with a cord word in the physical layer. That is, the uplink transport block is a unit of data that is delivered from the MAC layer to the physical layer.

Also, PUCCH is a physical channel that is used for transmitting uplink control information. Herein, the uplink control information includes HARQ-ACK. Also, the uplink control information includes CSI. Further, CSI includes Channel Quality Indicator (CQI), Pre-coding Matrix Indicator (PMI), and Rank Indication (RI). Also, the uplink control information includes Scheduling Request (SR) that is used for requesting assignment of a resource for transmission of uplink data by the mobile station device.

Herein, multiple formats are defined (supported) for PUCCH. Also, a format supported for PUCCH (a format supported by PUCCH) is called PUCCH format.

For example, on-off-keying as a modulation method is applied to a PUCCH format 1. For example, by using the PUCCH format 1, the mobile station device can transmit the scheduling request.

Also, for example, BPSK (Binary Phase Shift Keying) as a modulation method is applied to a PUCCH format 1a. For example, by using the PUCCH format 1a, the mobile station device can transmit HARQ-ACK of 1 bit per sub-frame. Also, by using the PUCCH format 1a, the mobile station device can transmit HARQ-ACK corresponding to a single cell (hereinafter, also written as single HARQ-ACK).

Herein, HARQ-ACK corresponding to a single cell includes HARQ-ACK corresponding to a downlink transport block that is transmitted on a single cell (single cell PDSCH). Herein, for example, the base station device can set a downlink transmission mode in each serving cell for the mobile station device. For example, if the base station device sets a downlink transmission mode that can transmit a single downlink transport block, by using PDSCH, the base station device transmits the single downlink transport block. For example, if a mode, in which a single downlink transport block can be transmitted, is set, the mobile station device can transmit HARQ-ACK of 1 bit corresponding to a single cell.

Also, for example, QPSK (Quadrature Phase Shift Keying) as a modulation method is applied to a PUCCH format 1b. For example, by using the PUCCH format 1b, the mobile station device can transmit HARQ-ACK of 2 bits per sub-frame. For example, by using the PUCCH format 1b, the mobile station device can transmit HARQ-ACK corresponding to a single cell.

Herein, if the base station device sets a downlink transmission mode that can transmit two downlink transport blocks at maximum, by using PDSCH, the base station device can transmit two downlink transport blocks at maximum. For example, if a mode, in which two downlink transport blocks can be transmitted, is set, and if the mobile station device receives the two downlink transport blocks, the mobile station device can transmit HARQ-ACK of 2 bits corresponding to a single cell.

Also, QPSK as a modulation method is applied to a PUCCH format 2. For example, by using the PUCCH format 2, the mobile station device can transmit CSI corresponding to a single cell (hereinafter, also written as single CSI). Also, for example, by using the PUCCH format 2, the mobile station device can simultaneously transmit CSI corresponding to a single cell and HARQ-ACK corresponding to a single cell. That is, by using the PUCCH format 2, the mobile station device can transmit CSI multiplexed with HARQ-ACK.

Herein, CSI corresponding to a single cell includes CSI for a downlink signal transmitted on a single cell (for example, PDSCH or downlink transport block). Herein, for example, the base station device can set a report mode of CSI for each cell for the mobile station device.

Also, for example, convolutional coding as a coding method is applied to the PUCCH format 2. Herein, for example, by applying convolutional coding, a coded bit sequence of 20 bits is generated. For example, by using the PUCCH format 2, the mobile station device can transmit coded bits (information) of 20 bits per sub-frame.

Also, QPSK and BPSK (QPSK+BPSK) as modulation methods are applied to a PUCCH format 2a. For example, by using the PUCCH format 2a, the mobile station device can simultaneously transmit CSI corresponding to a single cell (for example, QPSK is applied) and HARQ-ACK of 1 bit (for example, BPSK is applied). That is, by using the PUCCH format 2a, the mobile station device can transmit CSI multiplexed with HARQ-ACK of 1 bit. For example, by using the PUCCH format 2a, the mobile station device can transmit coded bits (information) of 21 bits per sub-frame.

Also, QPSK and QPSK (QPSK+QPSK) as modulation methods are applied to a PUCCH format 2b. For example, by using the PUCCH format 2b, the mobile station device can transmit CSI corresponding to a single cell (for example, QPSK is applied) and HARQ-ACK of 2 bits (for example, QPSK is applied). That is, by using the PUCCH format 2b, the mobile station device can transmit CSI multiplexed with HARQ-ACK of 2 bits. For example, by using the PUCCH format 2b, the mobile station device can transmit coded bits (information) of 22 bits per sub-frame.

Also, for example, QPSK as a modulation method is applied to a PUCCH format 3. For example, by using the PUCCH format 3, the mobile station device can transmit HARQ-ACK corresponding to a single cell or multiple cells (hereinafter, also written as multiple HARQ-ACK) and/or CSI corresponding to a single cell or multiple cells (hereinafter, also written as "multiple CSI").

That is, by using the PUCCH format 3, the mobile station device can simultaneously transmit HARQ-ACK corresponding to a single cell or multiple cells (for example, HARQ-ACK of 10 bits) and CSI corresponding to a single cell or multiple cells (for example, CSI of 10 bits). That is, by using the PUCCH format 3, the mobile station device can transmit CSI corresponding to a single cell or multiple cells multiplexed with HARQ-ACK corresponding to a single cell or multiple cells.

Also, by using the PUCCH format 3, the mobile station device can transmit only HARQ-ACK corresponding to a single cell or multiple cells. Also, by using the PUCCH format 3, the mobile station device can transmit only CSI corresponding to a single cell or multiple cells.

Herein, HARQ-ACK corresponding to multiple cells includes HARQ-ACK corresponding to downlink transport blocks that are transmitted on the respective multiple cells (PDSCH of multiple cells). That is, HARQ-ACK corresponding to multiple cells includes HARQ-ACK by a predetermined number at maximum corresponding to cells by a predetermined number at maximum (PDSCH of cells by a predetermined number at maximum).

Also, CSI corresponding to multiple cells includes CSI corresponding to respective downlink signals transmitted on multiple cells (for example, PDSCH or downlink transport blocks). That is, CSI corresponding to multiple cells includes CSI by a predetermined number at maximum corresponding to cells by a predetermined number at maximum.

Also, for example, by using the PUCCH format 3, the mobile station device can transmit HARQ-ACK corresponding to multiple cells, CSI corresponding to multiple cells, and a scheduling request (in a multiplexed manner). Also, for example, block coding as a coding method is applied to the PUCCH format 3. Herein, for example, by applying block coding, a coded bit sequence of 48 bits is generated. For example, by using the PUCCH format 3, the mobile station device can transmit coded bits (information) of 48 bits per sub-frame.

Also, for example, by using the PUCCH format 3, if the mobile station device transmits only CSI corresponding to multiple cells, the mobile station device can transmit CSI of 22 bits at maximum. Also, for example, by using the PUCCH format 3, if the mobile station device transmits only HARQ-ACK (or only HARQ-ACK and scheduling request), the mobile station device can transmit HARQ-ACK (or HARQ-ACK and scheduling request) by 22 bits at maximum. That is, for example, by using the PUCCH format 3, the mobile station device can transmit uplink control information by 22 bits at maximum.

Herein, by using the PUCCH format 3, the mobile station device may transmit only HARQ-ACK corresponding to a single cell or multiple cells, and by using a PUCCH format having a structure similar to the PUCCH format 3 (for example, PUCCH format 4), the mobile station device may transmit HARQ-ACK corresponding to a single cell or multiple cells and/or CSI corresponding to a single cell or multiple cells.

Hereinafter, description is basically given such that the mobile station device transmits HARQ-ACK corresponding to a single cell or multiple cells and/or CSI corresponding to a single cell or multiple cells by using the PUCCH format 3. However, of course, a similar embodiment may be applied to a case in which the mobile station device transmits HARQ-ACK corresponding to a single cell or multiple cells and/or CSI corresponding to a single cell or multiple cells by using a PUCCH format having a structure similar to the PUCCH format 3.

Further, the base station device and the mobile station device exchange (transmit and receive) a signal in a higher layer. For example, the base station device and the mobile station device transmit and receive a radio resource control signal (also called RRC signaling: Radio Resource Control signaling, RRC message: Radio Resource Control message, or RRC information: Radio Resource Control information) in a Radio Resource Control (RRC) layer.

Herein, in the RRC layer, a dedicated signal that is transmitted by the base station device to a certain mobile station device is also called dedicated signal (dedicated signal for certain mobile station device). That is, setting (information) that is designated by the base station device with use of the dedicated signal is setting specific to the certain mobile station device (UE-specific). Also, the base station device and the mobile station device transmit and receive a MAC control element in a MAC (Medium Access Control) layer. Herein, the RRC signaling and/or the MAC control element are also called Higher layer signaling.

Configuration of Base Station Device

Figure 2:
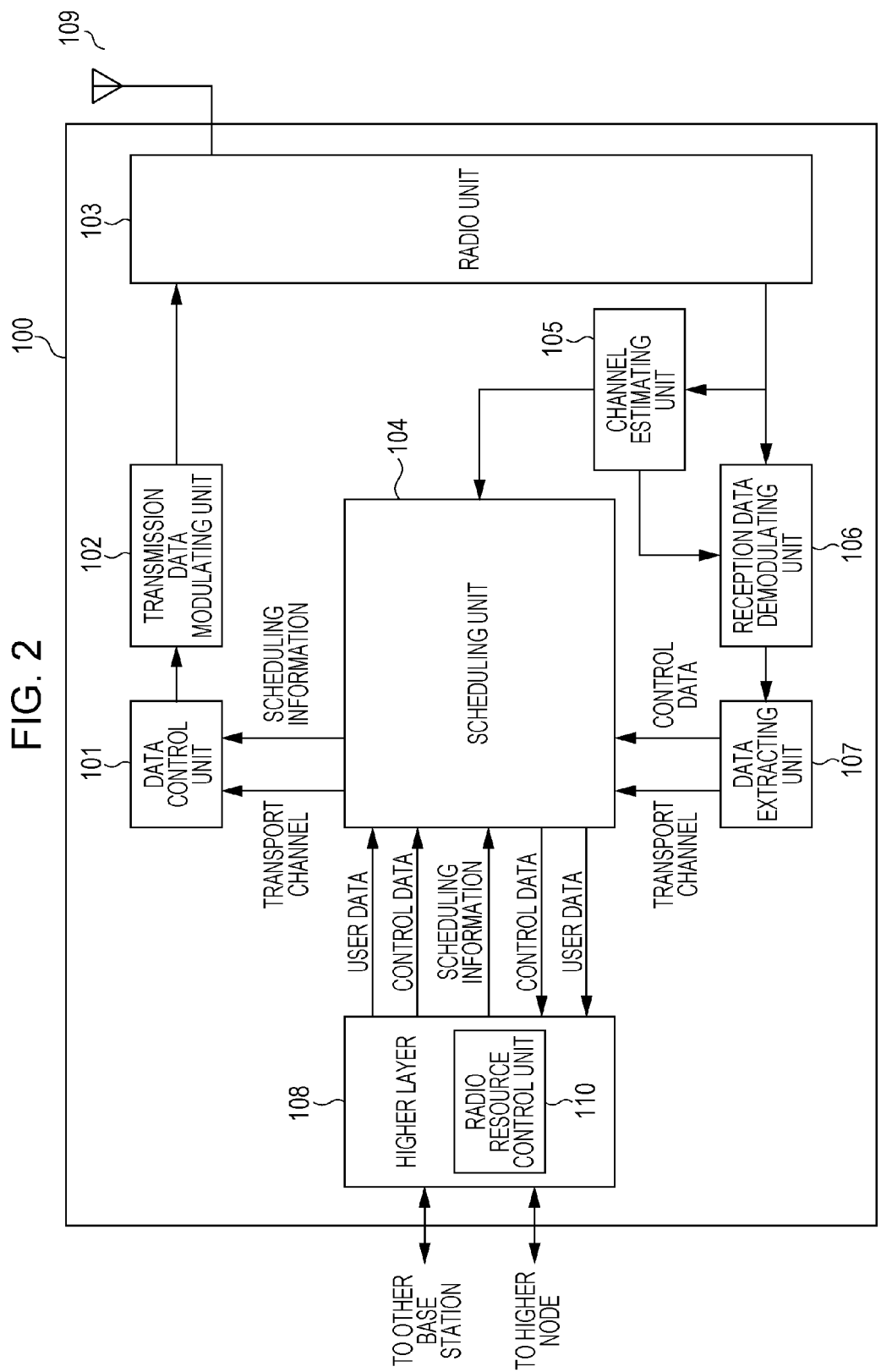
FIG. 2 is a block diagram showing a general configuration of a base station device according to this embodiment.

FIG. 2 is a block diagram showing a general configuration of a base station device 100 according to this embodiment. The base station device 100 includes a data control unit 101, a transmission data modulating unit 102, a radio unit 103, a scheduling unit 104, a channel estimating unit 105, a reception data demodulating unit 106, a data extracting unit 107, a higher layer 108, and an antenna 109. Also, the radio unit 103, the scheduling unit 104, the channel estimating unit 105, the reception data demodulating unit 106, the data extracting unit 107, the higher layer 108, and the antenna 109 form a receiving unit; and the data control unit 101, the transmission data modulating unit 102, the radio unit 103, the scheduling unit 104, the higher layer 108, and the antenna 109 form a transmitting unit. Herein, the respective units forming the base station device 100 are also called units.

The antenna 109, the radio unit 103, the channel estimating unit 105, the reception data demodulating unit 106, and the data extracting unit 107 perform processing for an uplink physical layer. The antenna 109, the radio unit 103, the transmission data modulating unit 102, and the data control unit 101 perform processing for a downlink physical layer.

The data control unit 101 receives a transport channel from the scheduling unit 104. The data control unit 101 maps the transport channel, and a signal and a channel generated in the physical layer, onto a physical channel based on scheduling information input from the scheduling unit 104. Each data mapped as described above is output to the transmission data modulating unit 102.

The transmission data modulating unit 102 modulates transmission data to OFDM system. The transmission data modulating unit 102 performs signal processing, such as coding, series/parallel conversion of an input signal, IFFT (Inverse Fast Fourier Transform) processing, CP (Cyclic Prefix) insertion, and filtering, on the data input from the data control unit 101, based on the scheduling information from the scheduling unit 104, and a modulation method and a coding method corresponding to each Physical Resource Block (PRB), generates transmission data, and outputs the data to the radio unit 103.

Herein, the scheduling information includes PRB assignment information, for example, positional information of PRB formed of frequency and time. The modulation method and coding method corresponding to each PRB include information, for example, a modulation method of 16QAM and a coding rate of 2/3.

The radio unit 103 generates a radio signal by up-converting modulated data input from the transmission data modulating unit 102 into a radio frequency, and transmits the radio signal to a mobile station device 200 through the antenna 109. Also, the radio unit 103 receives an uplink radio signal from the mobile station device 200 through the antenna 109, down-converts the uplink radio signal into a baseband signal, and outputs reception data to the channel estimating unit 105 and the reception data demodulating unit 106.

The scheduling unit 104 performs processing for the MAC layer. The scheduling unit 104 performs mapping of the logical channel and the transport channel, scheduling for downlink and uplink (HARQ processing, selection of transport format, etc.) and so forth. Since the scheduling unit 104 converges and controls processing units of respective physical layers, an interface is present between the scheduling unit 104, and the antenna 109, the radio unit 103, the channel estimating unit 105, the reception data demodulating unit 106, the data control unit 101, the transmission data modulating unit 102, and the data extracting unit 107.

For downlink scheduling, the scheduling unit 104 performs selection processing for a downlink transport format (transmission form, that is, assignment of PRB, modulation method, coding method) for modulating each data, re-transmission control in HARQ, and generation of scheduling information that is used for downlink, based on, for example, uplink control information received from the mobile station device 200, information of PRB that can be used in each mobile station device 200, a buffer status, and scheduling information input from the higher layer 108. The scheduling information that is used for downlink scheduling is output to the data control unit 101.

Also, for uplink scheduling, the scheduling unit 104 performs selection processing for an uplink transport format (transmission form, that is, assignment of PRB, modulation method, coding method) for modulating each data and generation of scheduling information that is used for uplink, based on, for example, an expectation result for an uplink channel state (radio propagation path state) output from the channel estimating unit 105, a resource assignment request from the mobile station device 200, information of PRB that can be used in each mobile station device 200, and scheduling information input from the higher layer 108. The scheduling information that is used for uplink scheduling is output to the data control unit 101.

Also, the scheduling unit 104 maps the downlink logical channel input from the higher layer 108 onto a transport channel, and outputs the result to the data control unit 101. Also, the scheduling unit 104 processes the control data and transport channel acquired in uplink and input from the data extracting unit 107 if required, maps the control data and transport channel onto an uplink logical channel, and outputs the result to the higher layer 108.

The channel estimating unit 105 estimates an uplink channel state from an Uplink Demodulation Reference Signal (UDRS) and outputs the estimation result to the reception data demodulating unit 106 for demodulation of uplink data. Also, for performing uplink scheduling, the channel estimating unit 105 estimates an uplink channel state from an uplink Sounding Reference Signal (SRS) and outputs the estimation result to the scheduling unit 104.

The reception data demodulating unit 106 serves as an OFDM demodulating unit and/or a DFT-Spread-OFDM (DFT-S-OFDM) demodulating unit that demodulate reception data, which has been modulated in the OFDM system and/or SC-FDMA system. The reception data demodulating unit 106 performs demodulating processing by providing signal processing, such as DFT conversion, sub-carrier mapping, IFFT conversion, and filtering, on the modulated data input from the radio unit 103 based on the uplink channel state estimation result input from the channel estimating unit 105, and outputs the result to the data extracting unit 107.

The data extracting unit 107 checks correctness and incorrectness of the data input from the reception data demodulating unit 106, and outputs the check result (ACK or NACK) to the scheduling unit 104. Also, the data extracting unit 107 separates the data input from the reception data demodulating unit 106 into a transport channel and control data in the physical layer, and outputs the result to the scheduling unit 104. The separated control data includes control information in CSI and HARQ and a scheduling request transmitted from the mobile station device 200.

The higher layer 108 performs processing of a packet Data Convergence Protocol (PDCP) layer, a Radio Link Control (RLC) layer, and a Radio Resource Control (RRC) layer. Since the higher layer 108 converges and controls processing units of a lower layer, an interface is present between the higher layer 108, and the scheduling unit 104, the antenna 109, the radio unit 103, the channel estimating unit 105, the reception data demodulating unit 106, the data control unit 101, the transmission data modulating unit 102, and the data extracting unit 107.

The higher layer 108 includes a radio resource control unit 110 (also called control unit). Also, the radio resource control unit 110 performs, for example, management of various setting information, management of system information, paging control, management of a communication state of each mobile station device 200, mobile management such as handover, management of a buffer status of each mobile station device 200, management of connection setting of unicast and multicast bearers, and management of mobile station identifier (UEID). The higher layer 108 gives and receives information to and from another base station device 100 and information to and from a higher node.

Configuration of Mobile Station Device

Figure 3:
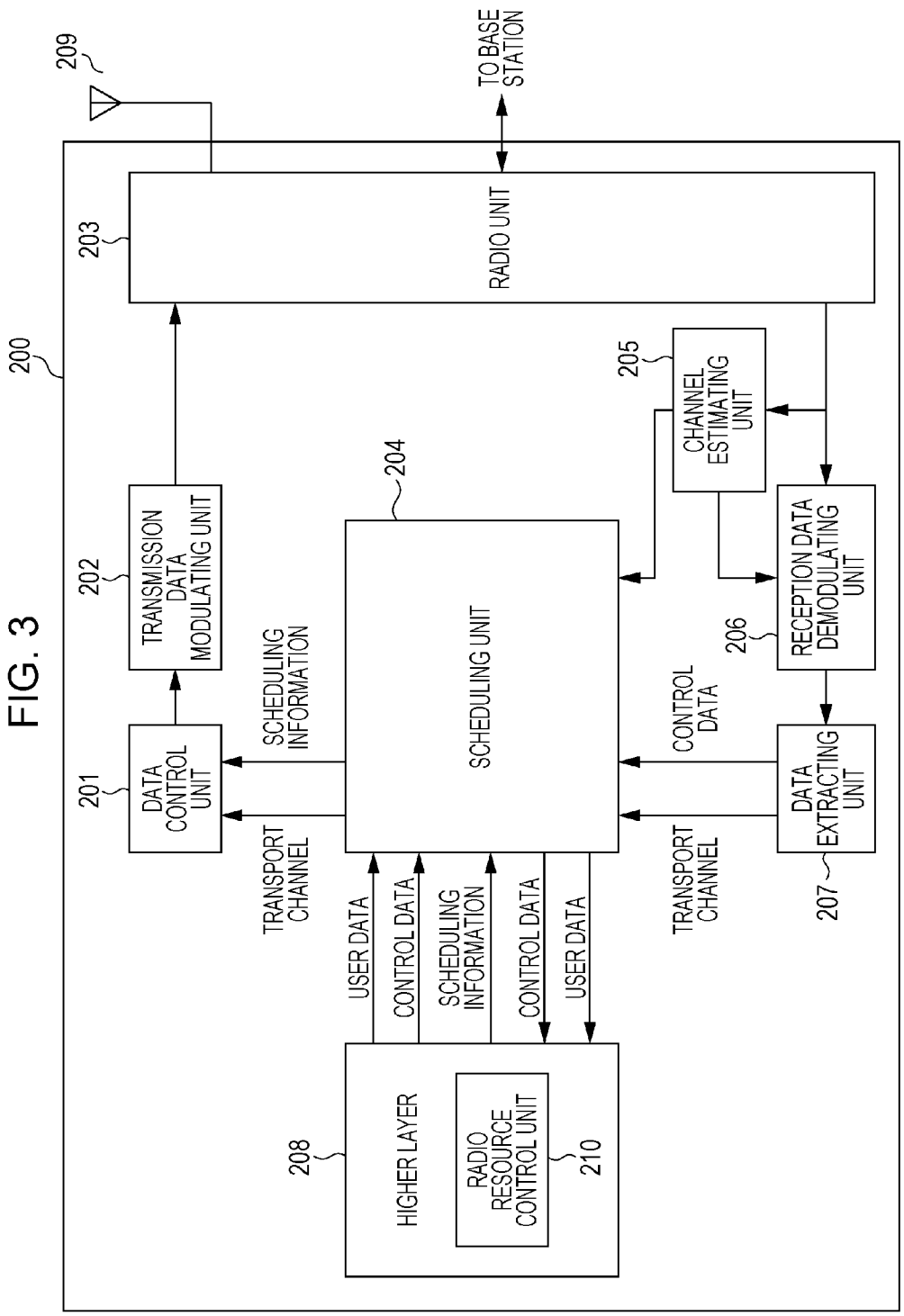
FIG. 3 is a block diagram showing a general configuration of a mobile station device according to this embodiment.

FIG. 3 is a block diagram showing a general configuration of the mobile station device 200 according to this embodiment. The mobile station device 200 includes a data control unit 201, a transmission data modulating unit 202, a radio unit 203, a scheduling unit 204, a channel estimating unit 205, a reception data demodulating unit 206, a data extracting unit 207, a higher layer 208, and an antenna 209. Also, the data control unit 201, the transmission data modulating unit 202, the radio unit 203, the scheduling unit 204, the higher layer 208, and the antenna 209 form a transmitting unit; and the radio unit 203, the scheduling unit 204, the channel estimating unit 205, the reception data demodulating unit 206, the data extracting unit 207, the higher layer 208, and the antenna 209 form a receiving unit. Herein, the respective units forming the mobile station device 200 are also called units.

The data control unit 201, the transmission data modulating unit 202, and the radio unit 203 perform processing for an uplink physical layer. The radio unit 203, the channel estimating unit 205, the reception data demodulating unit 206, and the data extracting unit 207 perform processing for a downlink physical layer.

The data control unit 201 receives a transport channel from the scheduling unit 204. The data control unit 201 maps the transport channel, and a signal and a channel generated in the physical layer, onto a physical channel based on scheduling information input from the scheduling unit 204. Each data mapped as described above is output to the transmission data modulating unit 202.

The transmission data modulating unit 202 modulates transmission data into OFDM system and/or SC-FDMA system. The transmission data modulating unit 202 performs signal processing, such as data modulation, DFT (discrete Fourier transform) processing, sub-carrier mapping, IFFT (inverted fast Fourier transform) processing, CP insertion, and filtering, on the data input from the control unit 201, generates transmission data, and outputs the transmission data to the radio unit 203.

The radio unit 203 generates a radio signal by up-converting modulated data input from the transmission data modulating unit 202 into a radio frequency, and transmits the radio signal to the base station device 100 through the antenna 209. Also, the radio unit 203 receives a modulated downlink radio signal from the base station device 100 through the antenna 209, down-converts the downlink radio signal into a baseband signal, and outputs reception data to the channel estimating unit 205 and the reception data demodulating unit 206.

The scheduling unit 204 performs processing for the MAC layer. The scheduling unit 104 performs mapping of a logical channel and a transport channel, scheduling for downlink and uplink (HARQ processing, selection of transport format, etc.) and so forth. Since the scheduling unit 204 converges and controls processing units of each physical layer, an interface is present between the scheduling unit 204, and the antenna 209, the data control unit 201, the transmission data modulating unit 202, the channel estimating unit 205, the reception data demodulating unit 206, the data extracting unit 207, and the radio unit 203.

For downlink scheduling, the scheduling unit 204 performs reception control for a transport channel, a physical signal, and a physical channel, HARQ re-transmission control, and generation of scheduling information that is used for downlink scheduling, based on scheduling information (transport format, HARQ re-transmission information) from the base station device 100 and the higher layer 208. The scheduling information that is used for downlink scheduling is output to the data control unit 201.

For uplink scheduling, the scheduling unit 204 performs scheduling processing for mapping an uplink logical channel input from the higher layer 208 onto a transport channel, and generation of scheduling information that is used for uplink scheduling, based on an uplink buffer status input from the higher layer 208, uplink scheduling information (transport format, HARQ re-transmission information) from the base station device 100 input from the data extracting unit 207, scheduling information input from the higher layer 208, and so forth. For the uplink transport format, information notified from the base station device 100 is used. The scheduling information is output to the data control unit 201.

Also, the scheduling unit 204 maps the uplink logical channel input from the higher layer 208 onto a transport channel, and outputs the result to the data control unit 201. Also, the scheduling unit 204 outputs channel state information input from the channel estimating unit 205 and the check result for CRC (Cyclic Redundancy Check) input from the data extracting unit 207, to the data control unit 201. Also, the scheduling unit 204 processes the control data and transport channel acquired in downlink input from the data extracting unit 207 if required, maps the control data and transport channel onto a downlink logical channel, and outputs the result to the higher layer 208.

The channel estimating unit 205 estimates a downlink channel state from a downlink reference signal and outputs the estimation result to the reception data demodulating unit 206 for demodulation of downlink data. Also, for notifying the base station device 100 about the estimation result of the downlink channel state, the channel estimating unit 205 estimates the downlink channel state from the downlink reference signal, and outputs the estimation result as channel state information to the scheduling unit 204.

The reception data demodulating unit 206 demodulates reception data, which has been modulated to OFDM system. The reception data demodulating unit 206 performs demodulation processing on modulation data input from the radio unit 203 based on the downlink channel state estimation result input from the channel estimating unit 205, and outputs the result to the data extracting unit 207.

The data extracting unit 207 performs CRC to check correctness/incorrectness of data input from the reception data demodulating unit 206, and outputs the check result (information indicative of ACK or NACK) to the scheduling unit 204. Also, the data extracting unit 207 separates the data input from the reception data demodulating unit 206 into a transport channel and control data in a physical layer, and outputs the result to the scheduling unit 204. The separated control data includes scheduling information, such as downlink or uplink resource assignment and uplink HARQ control information.

The higher layer 208 performs processing of a Packet Data Convergence Protocol (PDCP) layer, a Radio Link Control (RLC) layer, and a Radio Resource Control (RRC) layer. Since the higher layer 208 converges and controls processing units of a lower layer, an interface is present between the higher layer 208, and the scheduling unit 204, the antenna 209, the data control unit 201, the transmission data modulating unit 202, the channel estimating unit 205, the reception data demodulating unit 206, the data extracting unit 207, and the radio unit 203.

The higher layer 208 includes a radio resource control unit 210 (also called control unit). The radio resource control unit 210 performs, for example, management of various setting information, management of system information, paging control, management of a communication state of the mobile station device 200, mobile management such as handover, management of a buffer status, management of connection setting of unicast and multicast bearers, and management of mobile station identifier (UEID).

Regarding Cell Aggregation (Carrier Aggregation)

Figure 4:
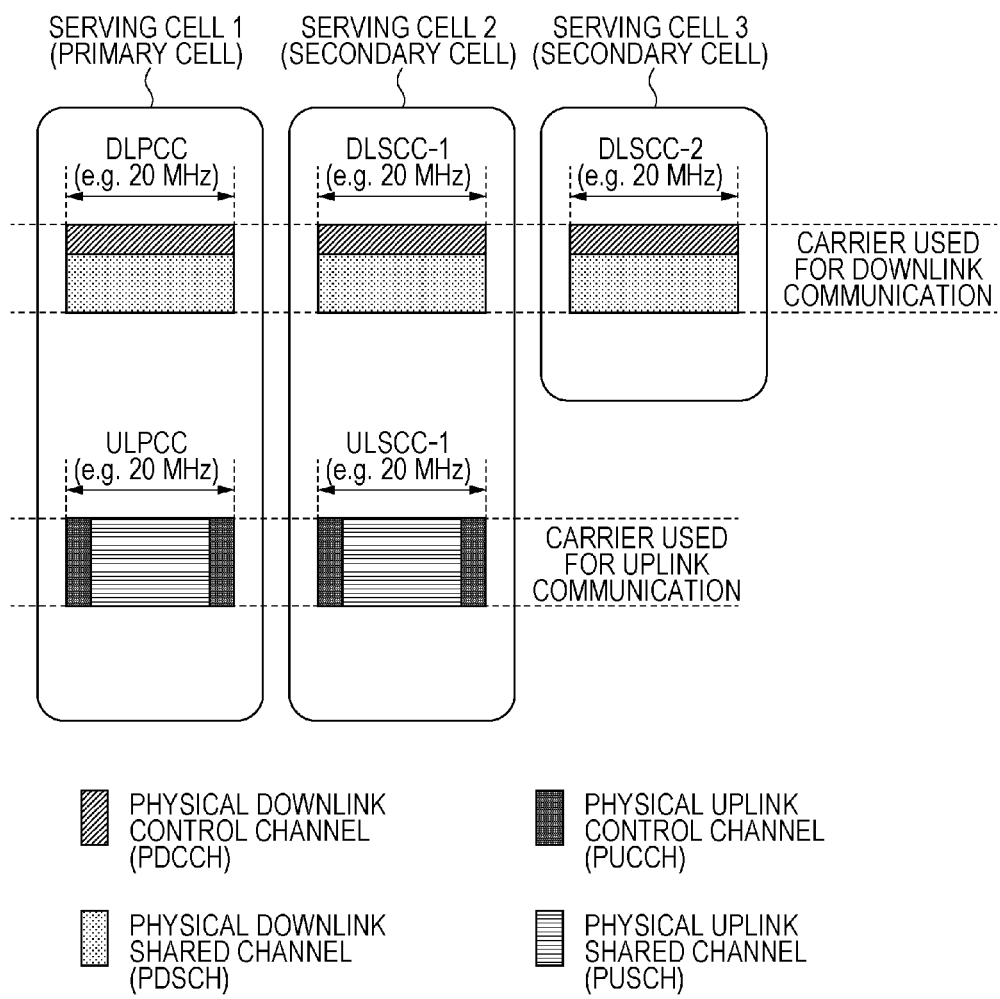
FIG. 4 is an illustration showing an example of a mobile communication system applicable to this embodiment.

FIG. 4 is an illustration explaining cell aggregation (or carrier aggregation) according to this embodiment. In this embodiment, cell aggregation is supported in uplink and downlink, and each serving cell may have, for example, a transmission bandwidth of 110 resource blocks at maximum.

FIG. 4 shows that three serving cells (serving cell 1, serving cell 2, serving cell 3) are aggregated. Herein, a serving cell in downlink is also called downlink cell. Also, the serving cell in uplink is also called uplink cell. Herein, the serving cell may be merely called cell.

In FIG. 4, the base station device sets a single or a set of multiple serving cells, which may be used for communication (to which PDCCH and/or PDSCH and/or PUSCH may be assigned), for the mobile station device. For example, the base station device sets a set of serving cells for the mobile station device by using RRC signaling.

Herein, in FIG. 4, for example, a single serving cell among the aggregated multiple serving cells is defined as a Primary cell (Pcell). For example, the primary cell is defined as the serving cell having a function equivalent to a cell of LTE Release 8/Release 9.

Also, the primary cell is defined as a cell on which the mobile station device performs an initial connection establishment procedure. Also, the primary cell is defined as a cell from which the mobile station device initiates a connection re-establishment procedure. Also, the primary cell is defined as a cell to which the mobile station device is instructed as the primary cell in a handover procedure.

Herein, for example, the base station device can instruct the primary cell to the mobile station device by using RRC signaling. Also, the primary cell is defined as a cell to which the mobile station device transmits uplink control information by using PUCCH. That is, PUCCH may be allocated only on the primary cell.

Also, in FIG. 4, serving cells excluding the primary cell is defined as Secondary cells (Scell). Each secondary cell is mainly used for providing an additional radio resource to the mobile station device, and is used for transmission and reception of information on PDSCH, PUSCH, or PRACH. For example, the base station device can instruct a secondary cell to the mobile station device by using RRC signaling. Also, for example, the base station device can instruct addition/removal of the secondary cell to the mobile station device by using RRC signaling.

Herein, a carrier corresponding to the serving cell in downlink is defined as Downlink Component Carrier (DLCO). Also, a carrier corresponding to the serving cell in uplink is defined as Uplink Component Carrier (ULCC).

Also, a carrier corresponding to the primary cell in downlink is defined as Downlink Primary Component Carrier (DLPCC). Also, a carrier corresponding to the secondary cell in downlink is defined as Downlink Secondary Component Carrier (DLSCC).

Also, a carrier corresponding to the primary cell in uplink is defined as Uplink Primary Component Carrier (ULPCC). Further, a carrier corresponding to the secondary cell in uplink is defined as Uplink Secondary Component Carrier (ULSCC).

First Embodiment

Next, this embodiment in a mobile communication system using the base station device 100 and the mobile station device 200 is described. In this embodiment, the base station device transmits a first parameter relating to simultaneous transmission of HARQ-ACK and CSI and a second parameter relating to simultaneous transmission of HARQ-ACK and CSI to the mobile station device. Also, if the mobile station device transmits HARQ-ACK corresponding to transmission of a single PDSCH only on the primary cell, the mobile station device transmits HARQ-ACK and/or CSI to the base station device according to the first parameter. Also, if the mobile station device transmits HARQ-ACK corresponding to transmission of a single PDSCH on the secondary cell, the mobile station device transmits HARQ-ACK and/or CSI to the base station device according to the second parameter.

Also, the base station device transmits a first parameter relating to simultaneous transmission of HARQ-ACK and CSI and a second parameter relating to simultaneous transmission of HARQ-ACK and CSI to the mobile station device. Also, if the mobile station device transmits HARQ-ACK corresponding to transmission of a single PDSCH only on the primary cell, the mobile station device transmits HARQ-ACK and/or CSI to the base station device according to the first parameter. Also, if the mobile station device transmits HARQ-ACK corresponding to transmission of a single PDSCH on at least a single secondary cell, the mobile station device transmits HARQ-ACK and/or CSI to the base station device according to the second parameter.

Also, the base station device transmits a first parameter relating to simultaneous transmission of HARQ-ACK and CSI and a second parameter relating to simultaneous transmission of HARQ-ACK and CSI to the mobile station device. Also, if the mobile station device detects, in a single PDSCH, downlink control information that instructs transmission of a single PDSCH only on the primary cell, the mobile station device transmits HARQ-ACK and/or CSI to the base station device according to the first parameter. Also, if the mobile station device detects, in a single PDCCH, downlink control information that instructs transmission of a single PDSCH on the secondary cell, the mobile station device transmits HARQ-ACK and/or CSI to the base station device according to the second parameter.

Also, the base station device transmits a first parameter relating to simultaneous transmission of HARQ-ACK and CSI and a second parameter relating to simultaneous transmission of HARQ-ACK and CSI to the mobile station device. Also, if the mobile station device detects, in a single PDCCH, downlink control information that instructs transmission of a single PDSCH only on the primary cell, the mobile station device transmits HARQ-ACK and/or CSI to the base station device according to the first parameter. Also, if the mobile station device detects, in PDCCH, downlink control information that instructs transmission of a single PDSCH on at least a single secondary cell, the mobile station device transmits HARQ-ACK and/or CSI to the base station device according to the second parameter.

Herein, HARQ-ACK includes information indicative of ACK/NACK for a downlink transport block. Also, HARQ-ACK includes information indicative of DTX. Also, CSI includes CSI (periodic CSI report) that is periodically transmitted (reported) by the mobile station device.

Herein, for example, the base station device transmits the first parameter to the mobile station device by using the higher layer signal (for example, the dedicated signal). Also, the base station device transmits the second parameter to the mobile station device by using the higher layer signal (for example, the dedicated signal).

Herein, the first parameter includes a parameter relating to simultaneous transmission of HARQ-ACK corresponding to a single cell and CSI corresponding to a single cell. That is, the first parameter includes a parameter relating to simultaneous transmission of HARQ-ACK for a downlink transport block that is transmitted on a single cell and CSI for a downlink signal that is transmitted on a single cell. That is, the base station device can set by using the first parameter, in the mobile station device, whether or not simultaneous transmission of HARQ-ACK corresponding to a single cell and CSI corresponding to a single cell is allowed. That is, the first parameter is used for an instruction to the mobile station device whether or not simultaneous transmission of HARQ-ACK corresponding to a single cell and CSI corresponding to a single cell is allowed.

Also, for example, the first parameter includes a parameter relating to simultaneous transmission of HARQ-ACK corresponding to a single cell and CSI corresponding to a single cell using the PUCCH format 2/2a/2b (PUCCH format 2, PUCCH format 2a, or PUCCH format 2b). That is, the base station device can set, in the mobile station device, simultaneous transmission of HARQ-ACK corresponding to a single cell and CSI corresponding to a single cell using the PUCCH format 2/2a/2b. That is, the first parameter is used for an instruction to the mobile station device whether or not simultaneous transmission of HARQ-ACK corresponding to a single cell and CSI corresponding to a single cell using the PUCCH format 2/2a/2b is allowed.

Herein, for example, the base station device sets the first parameter at TRUE if simultaneous transmission of HARQ-ACK corresponding to a single cell and CSI corresponding to a single cell is allowed. Also, the base station device sets the first parameter at FALSE if simultaneous transmission of HARQ-ACK corresponding to a single cell and CSI corresponding to a single cell is not allowed. That is, the first parameter is used for instructing setting of simultaneous transmission of HARQ-ACK corresponding to a single cell and CSI corresponding to a single cell. Hereinafter, the first parameter is also written as "simultaneousAckNackAndCQI."

For example, if the first parameter is set at TRUE, the mobile station device can simultaneously transmit HARQ-ACK corresponding to a single cell and CSI corresponding to a single cell. Also, if the first parameter is set at TRUE, the mobile station device can transmit HARQ-ACK corresponding to a single cell and CSI corresponding to a single cell by using the PUCCH format 2/2a/2b. Also, if the first parameter is set at TRUE, the mobile station device can transmit HARQ-ACK corresponding to a single cell and CSI corresponding to a single cell by using a n(2)PUCCH resource (described later).

Also, for example, if the first parameter is set at FALSE, the mobile station device drops CSI corresponding to a single cell (does not transmit CSI corresponding to a single cell), and can transmit only HARQ-ACK corresponding to a single cell. Also, if the first parameter is set at FALSE, the mobile station device can transmit only HARQ-ACK corresponding to a single cell by using the PUCCH format 1a/1b. Also, if the first parameter is set at FALSE, the mobile station device can transmit only HARQ-ACK corresponding to a single cell by using a n(1)PUCCH resource (described later).

Also, the second parameter includes a parameter relating to simultaneous transmission of HARQ-ACK corresponding to a single cell or multiple cells and CSI corresponding to a single cell or multiple cells. That is, the second parameter includes a parameter relating to simultaneous transmission of HARQ-ACK for a downlink transport block transmitted on a single cell or multiple cells and CSI for a downlink signal transmitted on a single cell or multiple cells. That is, the base station device can set by using the second parameter, in the mobile station device, whether or not simultaneous transmission of HARQ-ACK corresponding to a single cell or multiple cells and CSI corresponding to a single cell or multiple cells is allowed. That is, the second parameter is used for an instruction to the mobile station device whether or not simultaneous transmission of HARQ-ACK corresponding to a single cell or multiple cells and CSI corresponding to a single cell or multiple cells is allowed.

Also, the second parameter includes a parameter relating to simultaneous transmission of HARQ-ACK corresponding to a single cell or multiple cells and CSI corresponding to a single cell or multiple cells using the PUCCH format 3. That is, the base station device can set, in the mobile station device, simultaneous transmission of HARQ-ACK corresponding to a single cell or multiple cells and CSI corresponding to a single cell or multiple cells using the PUCCH format 3. That is, the second parameter is used for an instruction to the mobile station device whether or not simultaneous transmission of HARQ-ACK corresponding to a single cell or multiple cells and CSI corresponding to a single cell or multiple cells using the PUCCH format 3 is allowed.

Herein, for example, the base station device sets the second parameter at TRUE if simultaneous transmission of HARQ-ACK corresponding to a single cell or multiple cells and CSI corresponding to a single cell or multiple cells is allowed. Also, the base station device sets the second parameter at FALSE if simultaneous transmission of HARQ-ACK corresponding to a single cell or multiple cells and CSI corresponding to a single cell or multiple cells is not allowed. That is, the second parameter is used for instructing setting of simultaneous transmission of HARQ-ACK corresponding to a single cell or multiple cells and CSI corresponding to a single cell or multiple cells. Hereinafter, the second parameter is also written as "simultaneousAckNackAndCQI_v11."

For example, if the second parameter is set at TRUE, the mobile station device can simultaneously transmit HARQ-ACK corresponding to a single cell or multiple cells and CSI corresponding to a single cell or multiple cells. Also, if the second parameter is set at TRUE, the mobile station device can simultaneously transmit HARQ-ACK corresponding to a single cell or multiple cells and CSI corresponding to a single cell or multiple cells by using the PUCCH format 3. Also, if the second parameter is set at TRUE, the mobile station device can transmit HARQ-ACK corresponding to a single cell or multiple cells and CSI corresponding to a single cell or multiple cells by using a n(3)PUCCH resource (described later).

Also, for example, if the second parameter is set at FALSE, the mobile station device drops CSI corresponding to a single cell or multiple cells (does not transmit CSI corresponding to a single cell or multiple cells), and can transmit only HARQ-ACK corresponding to a single cell or multiple cells. Also, if the second parameter is set at FALSE, the mobile station device can transmit only HARQ-ACK corresponding to a single cell or multiple cells by using the PUCCH format 3. Also, if the second parameter is set at FALSE, the mobile station device can transmit only HARQ-ACK corresponding to a single cell or multiple cells by using the n(3)PUCCH resource (described later).

Herein, the number of bits of HARQ-ACK transmitted by using the PUCCH format 3 is determined by the number of cells and a downlink transmission mode in each cell. For example, the base station device can set the number of cells and the downlink transmission mode in each cell in the mobile station device by using the higher layer signal (for example, the dedicated signal).

Also, the base station device can transmit (set) a third parameter relating to simultaneous transmission of PUCCH and PUSCH to the mobile station device. That is, the third parameter includes a parameter relating to simultaneous transmission of PUCCH and PUSCH.

Herein, for example, the base station device transmits the third parameter to the mobile station device by using the higher layer signal (for example, the dedicated signal). That is, for example, the base station device can set by using the higher layer signal, in the mobile station device, the third parameter whether or not simultaneous transmission of PUCCH and PUSCH is allowed according to the third parameter. That is, the third parameter is used for an instruction to the mobile station device whether or not simultaneous transmission of PUCCH and PUSCH is set.

For example, if simultaneous transmission of PUCCH and PUSCH is allowed, the base station device sets the third parameter at TRUE. Also, if simultaneous transmission of PUCCH and PUSCH is not allowed, the base station device sets the third parameter at FALSE. That is, the third parameter is used for instructing setting of simultaneous transmission of PUCCH and PUSCH. Hereinafter, the third parameter is also written as "simultaneousPUCCH-PUSCH."

For example, default values of the first parameter, the second parameter, and the third parameters are FALSE.

Figure 5:
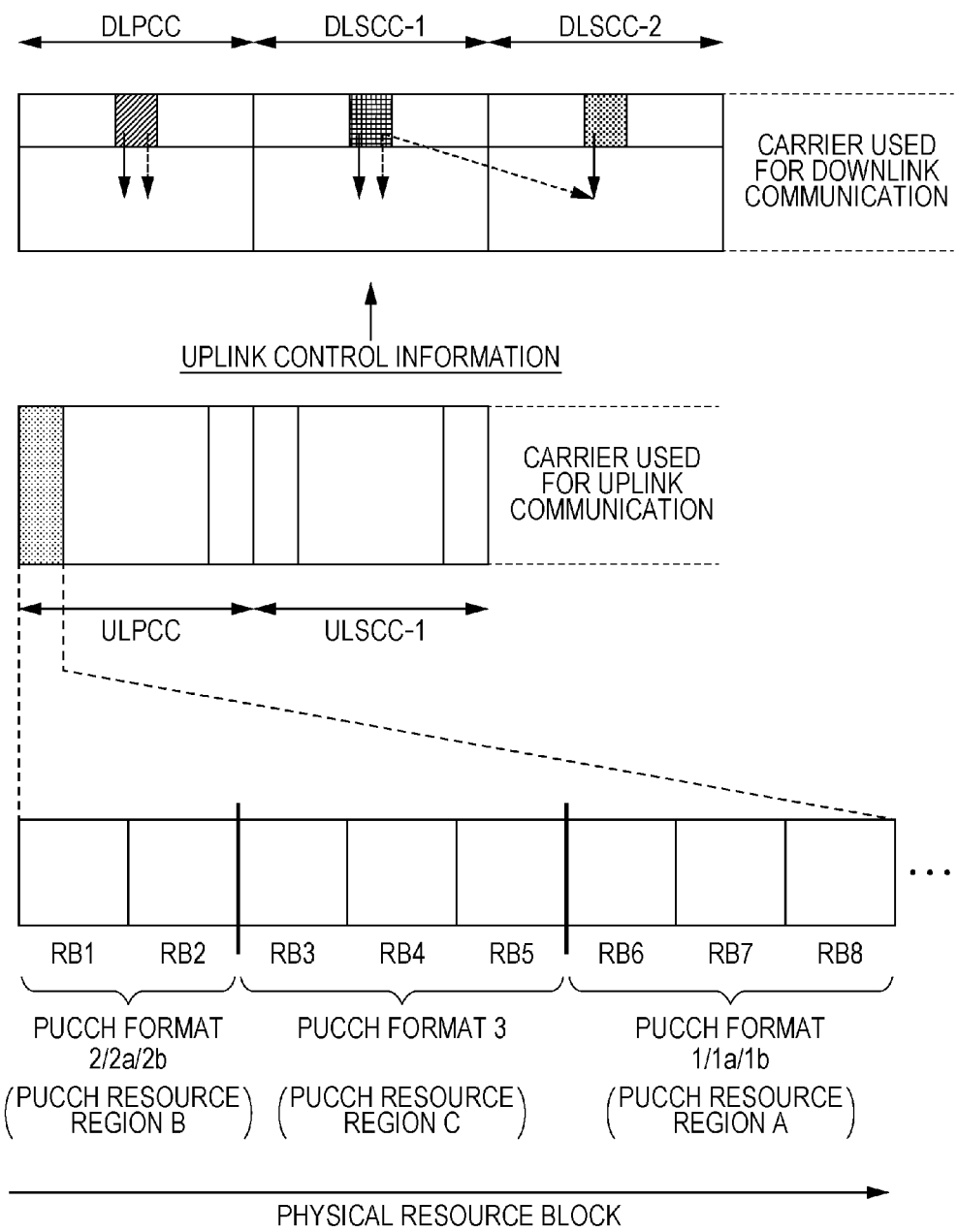
FIG. 5 is an illustration explaining this embodiment.

FIG. 5 is an illustration explaining this embodiment. FIG. 5 shows three serving cells. Herein, FIG. 5 corresponds to FIG. 4. That is, FIG. 5 shows a single primary cell (DLPCC, ULPCC) and two secondary cells (DLSCC-1, DLSCC-2, ULSCC-1).

In FIG. 5, the base station device schedules (assigns) (a single or multiple) PDSCH in the same sub-frame by using downlink control information transmitted on (a single or multiple) PDCCH allocated on the serving cell (downlink cell). Herein, the base station device may not schedule multiple PDSCH in the same sub-frame by using downlink control information transmitted on a single PDCCH.

Also, the base station can schedule PDSCH allocated on the same serving cell (downlink cell) as the serving cell (downlink cell) allocated with PDCCH. FIG. 5 shows that the base station device schedules PDSCH allocated on DLPCC by using downlink control information transmitted on PDCCH allocated on DLPCC (PDCCH indicated by oblique lines) by solid lines as an example. Also, FIG. 5 shows that the base station device schedules PDSCH allocated on DLSCC-1 by using downlink control information transmitted on PDCCH allocated on DLSCC-1 (PDCCH indicated by grid lines) by solid lines. Also, FIG. 5 shows that the base station device schedules PDSCH allocated on DLSCC-2 by using downlink control information transmitted on PDCCH allocated on DLSCC-2 (PDCCH indicated by mesh lines) by solid lines.

Also, in FIG. 5, the base station can schedule PDSCH allocated on the same or different serving cell (downlink cell) as or from the serving cell (downlink cell) allocated with PDCCH. For example, the base station device can schedule PDSCH allocated on the same or different serving cell as or from the serving cell allocated with PDCCH by transmitting a Component carrier Indicator (CIF, for example, expressed by 3 bits) in addition to the downlink control information transmitted on PDCCH.

FIG. 5 shows that the base station device schedules PDSCH allocated on DLPCC by using downlink control information transmitted on PDCCH allocated on DLPCC (indicated by oblique lines) by dotted lines as an example. Also, FIG. 5 shows that the base station device schedules PDSCH allocated on DLSCC-1 by using downlink control information transmitted on PDCCH allocated on DLSCC-1 (indicated by grid lines) by dotted lines. Also, FIG. 5 shows that the base station device schedules PDSCH allocated on DLSCC-2 by using downlink control information transmitted on PDCCH allocated on DLSCC-1 (indicated by mesh lines) by dotted lines as an example.

Herein, PDSCH on the primary cell is always scheduled by using downlink control information transmitted on PDCCH on the primary cell. That is, PDSCH on the primary cell is not scheduled by using downlink control information transmitted on PDCCH on the secondary cell.

In FIG. 5, the base station device transmits a downlink transport block (transport block for DL-SCH) by using PDSCH scheduled by downlink control information transmitted on PUCCH. For example, the base station device can transmit multiple downlink transport blocks in the same sub-frame by using PDSCHs scheduled by downlink control information transmitted on each of PDCCHs allocated on DLPCC, DLSCC-1, and DLSCC-2.

Also, in FIG. 5, a region extending from PUCCH allocated on ULPCC (PUCCH resource region indicated by a dot pattern) is conceptual expression of a PUCCH source region allocated on ULPCC. Herein, in FIG. 5, for easier description, the horizontal direction represents a physical resource block (which may be expressed as time-frequency resource, or simply, frequency resource, or band width), but an orthogonal resource is not described.

In FIG. 5, the base station device can designate a first region that the mobile station device can use PUCCH (for example, PUCCH resource region A from RB6 to RB8). That is, the base station device can designate the first region that the mobile station device can use the PUCCH format 1/1a/1b (PUCCH format 1, PUCCH format 1a, or PUCCH format 1b).

For example, the base station device can designate the first region to the mobile station device by using the higher layer signal. That is, the base station device can designate the first region to the mobile station device by notifying the mobile station device about information relating to the band width for the first region. Also, the base station device can designate the first region to the mobile station device by notifying the mobile station device about information relating to a starting point for the first region. Also, the base station device can designate the first region to the mobile station device by notifying the mobile station device about information relating to an orthogonal resource for the first region. Herein, for example, the information relating to the orthogonal resource includes a cyclic shift (the number of cyclic shifts) of a CAZAC sequence, and an index of an orthogonal sequence.

Also, the base station device can designate a second region that the mobile station device can use PUCCH (for example, PUCCH resource region B from RB1 to RB2). That is, the base station device can designate the second region that the mobile station device can use the PUCCH format 2/2a/2b (PUCCH format 2, PUCCH format 2a, or PUCCH format 2b).

For example, the base station device can designate the second region to the mobile station device by using the higher layer signal. That is, the base station device can designate the second region to the mobile station device by notifying the mobile station device about information relating to the band width for the second region. Also, the base station device can designate the second region to the mobile station device by notifying the mobile station device about information relating to a starting point for the second region. Also, the base station device can designate the second region to the mobile station device by notifying the mobile station device about information relating to an orthogonal resource for the second region.

Also, the base station device can designate a third region that the mobile station device can use PUCCH (for example, PUCCH resource region C from RB3 to RB5). That is, the base station device can designate the third region that the mobile station device can use the PUCCH format 3.

For example, the base station device can designate the third region to the mobile station device by using the higher layer signal. That is, the base station device can designate the third region to the mobile station device by notifying the mobile station device about information relating to the band width for the third region. Also, the base station device can designate the third region to the mobile station device by notifying the mobile station device about information relating to a starting point for the third region. Also, the base station device can designate the third region to the mobile station device by notifying the mobile station device about information relating to an orthogonal resource for the third region.

Further, the base station device can schedule (assign, set, instruct) a PUCCH resource in the mobile station device to each PUCCH resource region (PUCCH resource region A, PUCCH resource region B, PUCCH resource region C). That is, the base station device can schedule a PUCCH resource that is used when the mobile station device transmits uplink control information (HARQ-ACK and/or CSI and/or scheduling request), in each PUCCH resource region.

That is, the base station device can schedule a PUCCH resource (also called n(1)PUCCH resource) that is used when the mobile station device transmits uplink control information by using the PUCCH format 1/1a/1b. Also, the base station device can schedule a PUCCH resource (also called n(2)PUCCH resource) that is used when the mobile station device transmits uplink control information by using the PUCCH format 2/2a/2b. Also, the base station device can schedule a PUCCH resource (also called n(3)PUCCH resource) that is used when the mobile station device transmits uplink control information by using the PUCCH format 3.

For example, the base station device can set the PUCCH resource in the mobile station device by using the higher layer signal. For example, the base station device can set the n(2) PUCCH resource in the mobile station device by using the higher layer signal.

Also, for example, the base station device can instruct the PUCCH resource in association with PDCCH. For example, the base station device can instruct the n(1)PUCCH resource to the mobile station device by using the number of the first CCE (Control Channel Element) that is used for transmission of PDCCH (that forms PDCCH).

Also, for example, the base station device can instruct the PUCCH resource by using the higher layer signal and downlink control information transmitted on PDCCH. For example, the base station device sets four PUCCH resources by using the higher layer signal, and further instructs a single PUCCH resource from among the set four PUCCH resources. Hence, the base station device can instruct the n(3)PUCCH resource to the mobile station device.

That is, the base station device can schedule each PUCCH resource that is used when the mobile station device transmits uplink control information by using the PUCCH format 1/1a/1b, the PUCCH format 2/2a/2b, or the PUCCH format 3. That is, the base station device can schedule different PUCCH resources as the n(1)PUCCH resource, the n(2)PUCCH resource, and the n(3)PUCCH resource.

In FIG. 5, the mobile station device transmits an uplink transport block (transport block for UL-SCH) by using PUSCH scheduled by downlink control information transmitted on PUCCH. For example, the mobile station device can transmit multiple uplink transport blocks in the same sub-frame by using PUSCHs allocated on ULPCC, ULSCC-1.

Also, in FIG. 5, the mobile station device transmits uplink control information by using PUSCH and/or PUCCH. That is, for example, the mobile station device transmits uplink control information by using PUSCH scheduled by the base station device.

Also, the mobile station device transmits uplink control information by using the PUCCH format (PUCCH format 1/1a/1b, PUCCH format 2/2a/2b, or PUCCH format 3). At this time, the mobile station device transmits uplink control information by using the PUSCH resource (n(1)PUCCH resource, n(2)PUCCH resource, or n(3)PUCCH resource) scheduled by the base station device.

Figure 6:
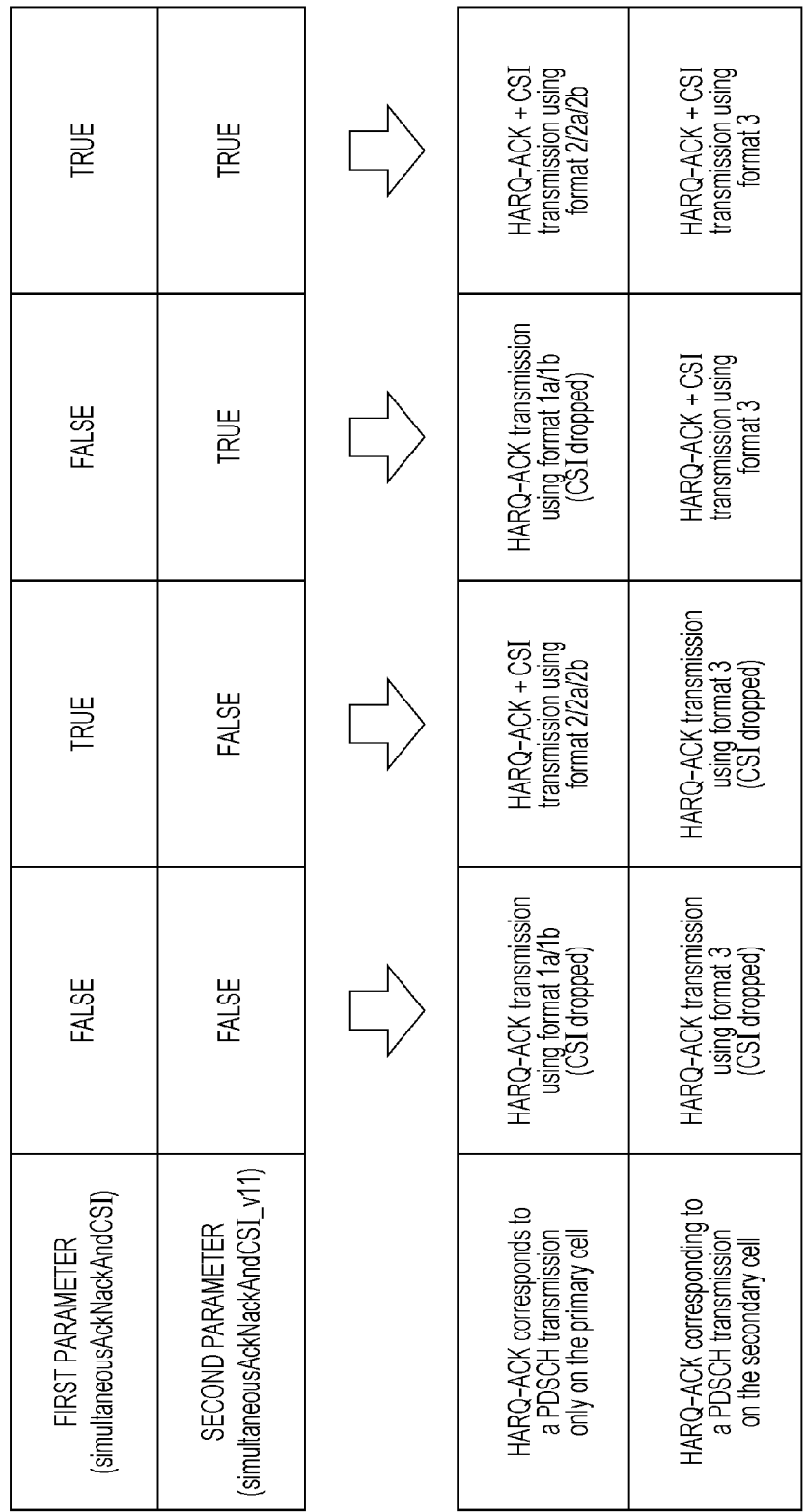
FIG. 6 is another illustration explaining this embodiment.

FIG. 6 is still another illustration explaining this embodiment. FIG. 6 shows a transmission method of HARQ-ACK and/or CSI by the mobile station device, which has received the first parameter set at TRUE or FALSE and the second parameter set at TRUE or FALSE. That is, FIG. 6 shows a transmission method of HARQ-ACK and/or CSI in a sub-frame, in which PUSCH (PUSCH resource) is not scheduled by the base station device.

Hereinafter, described with explanation in FIG. 6 is a transmission method of HARQ-ACK and/or CSI by the mobile station device in a sub-frame in which HARQ-ACK (transmission of HARQ-ACK) and CSI (transmission of CSI) collide with each other (simultaneously occur). Herein, in the explanation in FIG. 6, the sub-frame in which HARQ-ACK and CSI collide with each other represents a sub-frame without PUSCH.

As shown in FIG. 6, in case of collision between HARQ-ACK and CSI in a sub-frame without PUSCH, the mobile station device changes the transmission method of HARQ-ACK and/or CSI, the change of the transmission method depending on the case that which cell's HARQ-ACK is transmitted, the HARQ-ACK corresponding to transmission of PDSCH.

That is, in case of collision between HARQ-ACK and CSI, the mobile station device changes the transmission method of HARQ-ACK and/or CSI, the change of the transmission method depending on the case that which cell's HARQ-ACK is transmitted, the HARQ-ACK corresponding to a downlink transport block transmitted on PDSCH.

For example, in case of collision between HARQ-ACK and CSI in a sub-frame without PUSCH, the mobile station device changes the PUCCH format that is used for transmission of HARQ-ACK and/or CSI, the change of the transmission method depending on the case that which cell's HARQ-ACK is transmitted, the HARQ-ACK corresponding to transmission of PDSCH.

Also, in case of collision between HARQ-ACK and CSI in a sub-frame without PUSCH, the mobile station device changes the PUCCH resource (uses different PUCCH resource) that is used for transmission of HARQ-ACK and/or CSI, the change of the transmission method depending on the case that which cell's HARQ-ACK is transmitted, the HARQ-ACK corresponding to transmission of PDSCH.

That is, in case of collision between HARQ-ACK and CSI in a sub-frame without PUSCH, the mobile station device changes the PUCCH format (uses different PUCCH format) that is used for transmission of HARQ-ACK and/or CSI, the change of the transmission method depending on the case that which cell's HARQ-ACK is transmitted, the HARQ-ACK corresponding to a downlink transport block transmitted on PDSCH.

That is, in case of collision between HARQ-ACK and CSI in a sub-frame without PUSCH, the mobile station device changes the PUCCH resource (uses different PUCCH resource) that is used for transmission of HARQ-ACK and/or CSI, the change of the transmission method depending on the case that which cell's HARQ-ACK is transmitted, the HARQ-ACK corresponding to a downlink transport block transmitted on PDSCH.

For example, if the mobile station device transmits HARQ-ACK corresponding to transmission of a single PDSCH only on the primary cell, the mobile station device transmits HARQ-ACK and/or CSI according to the first parameter. That is, if the mobile station device transmits HARQ-ACK corresponding to a downlink transport block transmitted on a single PDSCH only on the primary cell, the mobile station device transmits HARQ-ACK and/or CSI according to the first parameter.

Also, if the mobile station device transmits HARQ-ACK corresponding to transmission of a single PDSCH on the secondary cell, the mobile station device transmits HARQ-ACK and/or CSI according to the second parameter. That is, if the mobile station device transmits HARQ-ACK corresponding to a downlink transport block transmitted on a single PDSCH on the secondary cell, the mobile station device transmits HARQ-ACK and/or CSI according to the second parameter.

Also, if the mobile station device transmits HARQ-ACK corresponding to transmission of multiple PDSCHs on the primary cell and the secondary cell, the mobile station device transmits HARQ-ACK and/or CSI according to the second parameter. That is, if the mobile station device transmits HARQ-ACK corresponding to downlink transport blocks transmitted on multiple PDSCHs on the primary cell and the secondary cell, the mobile station device transmits HARQ-ACK and/or CSI according to the second parameter.

Also, if the mobile station device transmits HARQ-ACK corresponding to transmission of multiple PDSCHs on multiple secondary cells, the mobile station device transmits HARQ-ACK and/or CSI according to the second parameter. That is, if the mobile station device transmits HARQ-ACK corresponding to downlink transport blocks transmitted on multiple PDSCHs on multiple secondary cells, the mobile station device transmits HARQ-ACK and/or CSI according to the second parameter.

That is, if the mobile station device transmits HARQ-ACK corresponding to transmission of PDSCH on at least a single secondary cell, the mobile station device transmits HARQ-ACK and/or CSI according to the second parameter. That is, if the mobile station device transmits HARQ-ACK corresponding to a downlink transport block transmitted on PDSCH on at least a single secondary cell, the mobile station device transmits HARQ-ACK and/or CSI according to the second parameter.

As shown in FIG. 6, for example, the mobile station device, which has received the first parameter set at FALSE and the second parameter set at FALSE, transmits HARQ-ACK and/or CSI according to the first parameter if the mobile station device transmits HARQ-ACK corresponding to transmission of a single PDSCH only on the primary cell.

That is, the mobile station device drops CSI and transmits only HARQ-ACK. That is, the mobile station device transmits only HARQ-ACK by using the PUCCH format 1*a*/1*b*. Also, the mobile station device transmits only HARQ-ACK by using the n(1)PUCCH resource. Herein, HARQ-ACK that is transmitted by the mobile station device includes HARQ-ACK corresponding to a single cell (the primary cell). Also, CSI that is dropped by the mobile station device includes CSI corresponding to a single cell (the primary cell or the secondary cell).

Also, for example, the mobile station device, which has received the first parameter set at FALSE and the second parameter set at FALSE, transmits HARQ-ACK and/or CSI according to the second parameter if the mobile station device transmits HARQ-ACK corresponding to transmission of a single PDSCH on the secondary cell (or transmission of PDSCH on at least a single secondary cell).

That is, the mobile station device drops CSI and transmits only HARQ-ACK. That is, the mobile station device transmits only HARQ-ACK by using the PUCCH format 3. Also, the mobile station device transmits only HARQ-ACK by using the n(3)PUCCH resource. Herein, HARQ-ACK that is transmitted by the mobile station device includes HARQ-ACK corresponding to a single cell or multiple cells. Also, CSI that is dropped by the mobile station device includes CSI corresponding to a single cell or multiple cells.

Also, for example, the mobile station device, which has received the first parameter set at TRUE and the second parameter set at FALSE, transmits HARQ-ACK and/or CSI according to the first parameter if the mobile station device transmits HARQ-ACK corresponding to transmission of a single PDSCH only on the primary cell.

That is, the mobile station device simultaneously transmits HARQ-ACK and CSI. That is, in case of collision between HARQ-ACK and CSI in a same sub-frame without PUSCH, if the first parameter is set at TRUE and if HARQ-ACK corresponds to transmission of a single PDSCH only on the primary cell, CSI is multiplexed with HARQ-ACK on PUCCH.

That is, the mobile station device transmits HARQ-ACK and CSI by using the PUCCH format 2/2*a*/2*b*. Also, the mobile station device transmits HARQ-ACK and CSI by using the n(2)PUCCH resource. Herein, HARQ-ACK that is transmitted by the mobile station device includes HARQ-ACK corresponding to a single cell (the primary cell). Also, CSI that is transmitted by the mobile station device includes CSI corresponding to a single cell (the primary cell or the secondary cell).

Also, for example, the mobile station device, which has received the first parameter set at TRUE and the second parameter set at FALSE, transmits HARQ-ACK and/or CSI according to the second parameter if the mobile station device transmits HARQ-ACK corresponding to transmission of a single PDSCH on the secondary cell (or transmission of PDSCH on at least a single secondary cell).

That is, the mobile station device drops CSI and transmits only HARQ-ACK. That is, the mobile station device transmits only HARQ-ACK by using the PUCCH format 3. Also, the mobile station device transmits only HARQ-ACK by using the n(3)PUCCH resource. Herein, HARQ-ACK that is transmitted by the mobile station device includes HARQ-ACK corresponding to a single cell or multiple cells. Also, CSI that is dropped by the mobile station device includes CSI corresponding to a single cell or multiple cells.

Also, for example, the mobile station device, which has received the first parameter set at FALSE and the second parameter set at TRUE, transmits HARQ-ACK and/or CSI according to the first parameter if the mobile station device transmits HARQ-ACK corresponding to transmission of a single PDSCH only on the primary cell.

That is, the mobile station device drops CSI and transmits only HARQ-ACK. That is, the mobile station device transmits only HARQ-ACK by using the PUCCH format 1*a*/1*b*. Also, the mobile station device transmits only HARQ-ACK by using the n(1)PUCCH resource. Herein, HARQ-ACK that is transmitted by the mobile station device includes HARQ-ACK corresponding to a single cell (the primary cell). Also, CSI that is dropped by the mobile station device includes CSI corresponding to a single cell (the primary cell or the secondary cell).

Also, for example, the mobile station device, which has received the first parameter set at FALSE and the second parameter set at TRUE, transmits HARQ-ACK and/or CSI according to the second parameter if the mobile station device transmits HARQ-ACK corresponding to transmission of a single PDSCH on the secondary cell (or transmission of PDSCH on at least a single secondary cell).

That is, the mobile station device simultaneously transmits HARQ-ACK and CSI. That is, in case of collision between HARQ-ACK and CSI in a same sub-frame without PUSCH, if the second parameter is set at TRUE and if HARQ-ACK corresponds to transmission of a single PDSCH on the secondary cell (or transmission of PDSCH on at least a single secondary cell), CSI is multiplexed with HARQ-ACK on PUCCH.

That is, the mobile station device transmits HARQ-ACK and CSI by using the PUCCH format 3. Also, the mobile station device transmits HARQ-ACK and CSI by using the n(3)PUCCH resource. Herein, HARQ-ACK that is transmitted by the mobile station device includes HARQ-ACK corresponding to a single cell or multiple cells. Also, CSI that is transmitted by the mobile station device includes CSI corresponding to a single cell or multiple cells.

Also, for example, the mobile station device, which has received the first parameter set at TRUE and the second parameter set at TRUE, transmits HARQ-ACK and/or CSI according to the first parameter if the mobile station device transmits HARQ-ACK corresponding to transmission of a single PDSCH only on the primary cell.

That is, the mobile station device simultaneously transmits HARQ-ACK and CSI. That is, when HARQ-ACK and CSI conflict with each other in the same sub-frame without PUSCH, if the first parameter is set at TRUE and if HARQ-ACK corresponds to transmission of a single PDSCH only on the primary cell, CSI is multiplexed with HARQ-ACK on PUCCH.

That is, the mobile station device transmits HARQ-ACK and CSI by using the PUCCH format 2/2a/2b. Also, the mobile station device transmits HARQ-ACK and CSI by using the n(2)PUCCH resource. Herein, HARQ-ACK that is transmitted by the mobile station device includes HARQ-ACK corresponding to a single cell (the primary cell). Also, CSI that is transmitted by the mobile station device includes CSI corresponding to a single cell (the primary cell or the secondary cell).

Also, for example, the mobile station device, which has received the first parameter set at TRUE and the second parameter set at TRUE, transmits HARQ-ACK and/or CSI according to the second parameter if the mobile station device transmits HARQ-ACK corresponding to transmission of a single PDSCH on the secondary cell (or transmission of PDSCH on at least a single secondary cell).

That is, the mobile station device simultaneously transmits HARQ-ACK and CSI. That is, in case of collision between HARQ-ACK and CSI in a same sub-frame without PUSCH, if the second parameter is set at TRUE and if HARQ-ACK corresponds to transmission of a single PDSCH on the secondary cell (or transmission of PDSCH on at least a single secondary cell), CSI is multiplexed with HARQ-ACK on PUCCH.

That is, the mobile station device transmits HARQ-ACK and CSI by using the PUCCH format 3. Also, the mobile station device transmits HARQ-ACK and CSI by using the n(3)PUCCH resource. Herein, HARQ-ACK that is transmitted by the mobile station device includes HARQ-ACK corresponding to a single cell or multiple cells. Also, CSI that is transmitted by the mobile station device includes CSI corresponding to a single cell or multiple cells.

Further, in FIG. 6, in case of collision between HARQ-ACK and CSI in a sub-frame without PUSCH, the mobile station device, which has received the first parameter and the second parameter, may change the transmission method of HARQ-ACK and/or CSI depending on the cell on which transmission of PDSCH is instructed by downlink control information detected in PDSCH.

Further, in case of collision between HARQ-ACK and CSI in a sub-frame without PUSCH, the mobile station device may change the transmission method of HARQ-ACK and/or CSI depending on the cell on which transmission of a downlink transport block on PDSCH is instructed by downlink control information detected in PDCCH.

For example, in case of collision between HARQ-ACK and CSI in a sub-frame without PUSCH, the mobile station device changes the PUCCH format (uses different PUCCH format) that is used for transmission of HARQ-ACK and/or CSI depending on the cell on which transmission of PDSCH is instructed by downlink control information detected in PDCCH.

For example, in case of collision between HARQ-ACK and CSI in a sub-frame without PUSCH, the mobile station device changes the PUCCH resource (uses different PUCCH resource) that is used for transmission of HARQ-ACK and/or CSI depending on the cell on which transmission of PDSCH is instructed by downlink control information detected in PDCCH.

That is, in case of collision between HARQ-ACK and CSI in a sub-frame without PUSCH, the mobile station device changes the PUCCH format (uses different PUCCH format) that is used for transmission of HARQ-ACK and/or CSI depending on the cell on which transmission of a downlink transport block on PDSCH is instructed by downlink control information detected in PDCCH.

That is, in case of collision between HARQ-ACK and CSI in a sub-frame without PDSCH, the mobile station device changes the PUCCH resource (uses different PUCCH resource) that is used for transmission of HARQ-ACK and/or CSI depending on the cell on which transmission of a downlink transport block on PDSCH is instructed by downlink control information detected in PDCCH.

For example, if the mobile station device detects, in a single PDCCH, downlink control information that instructs transmission of a single PDSCH only on the primary cell, the mobile station device transmits HARQ-ACK and/or CSI according to the first parameter. That is, if the mobile station device detects, in a single PDCCH, downlink control information that instructs transmission of a downlink transport block on a single PDSCH only on the primary cell, the mobile station device transmits HARQ-ACK and/or CSI according to the first parameter.

Also, if the mobile station device detects, in a single PDCCH, downlink control information that instructs transmission of a single PDSCH on the secondary cell, the mobile station device transmits HARQ-ACK and/or CSI according to the second parameter. That is, if the mobile station device detects, in a single PDSCH, downlink control information that instructs transmission of a downlink transport block on a single PDSCH on the secondary cell, the mobile station device transmits HARQ-ACK and/or CSI according to the second parameter.

Also, if the mobile station device detects, in multiple PDCCHs, downlink control information that instructs transmission of multiple PDSCHs on the primary cell and the secondary cell, the mobile station device transmits HARQ-ACK and/or CSI according to the second parameter. Also, if the mobile station device detects, in multiple PDCCHs, downlink control information that instructs transmission of downlink transport blocks on multiple PDSCHs on the primary cell and the secondary cell, the mobile station device transmits HARQ-ACK and/or CSI according to the second parameter.

Also, if the mobile station device detects, in multiple PDCCHs, downlink control information that instructs transmission of multiple PDSCHs on multiple secondary cells and multiple PDCCHs, the mobile station device transmits HARQ-ACK and/or CSI according to the second parameter. That is, if the mobile station device detects, in multiple PDCCHs, downlink control information that instructs transmission of downlink transport blocks on multiple PDSCH on multiple secondary cells, the mobile station device transmits HARQ-ACK and/or CSI according to the second parameter.

That is, if the mobile station device detects, in PDCCH, downlink control information that instructs transmission of PDSCH on at least a single secondary cell, the mobile station device transmits HARQ-ACK and/or CSI according to the second parameter. That is, if the mobile station device detects, in PDCCH, downlink control information that instructs transmission of a downlink transport block on PDSCH on at least a single secondary cell, the mobile station device transmits HARQ-ACK and/or CSI according to the second parameter.

In FIG. 6, for example, the mobile station device, which has received the first parameter set at FALSE and the second parameter set at FALSE, transmits HARQ-ACK and/or CSI according to the first parameter if the mobile station device detects, in PDCCH, downlink control information that instructs transmission of a single PDSCH only on the primary cell.

That is, the mobile station device drops CSI and transmits only HARQ-ACK. That is, the mobile station device transmits only HARQ-ACK by using the PUCCH format 1a/1b. Also, the mobile station device transmits only HARQ-ACK by using the n(1)PUCCH resource. Herein, HARQ-ACK that is transmitted by the mobile station device includes HARQ-ACK corresponding to a single cell (the primary cell). Also, CSI that is dropped by the mobile station device includes CSI corresponding to a single cell (the primary cell or the secondary cell).

Also, for example, the mobile station device, which has received the first parameter set at FALSE and the second parameter set at FALSE, transmits HARQ-ACK and/or CSI according to the second parameter if the mobile station device detects, in PDCCH, downlink control information that instructs transmission of a single PDSCH on the secondary cell (or transmission of PDSCH on at least a single secondary cell).

That is, the mobile station device drops CSI and transmits only HARQ-ACK. That is, the mobile station device transmits only HARQ-ACK by using the PUCCH format 3. Also, the mobile station device transmits only HARQ-ACK by using the n(3)PUCCH resource. Herein, HARQ-ACK that is transmitted by the mobile station device includes HARQ-ACK corresponding to a single cell or multiple cells. Also, CSI that is dropped by the mobile station device includes CSI corresponding to a single cell or multiple cells.

Also, for example, the mobile station device, which has received the first parameter set at TRUE and the second parameter set at FALSE, transmits HARQ-ACK and/or CSI according to the first parameter if the mobile station device detects, in PDCCH, downlink control information that instructs transmission of a single PDSCH only on the primary cell.

That is, the mobile station device simultaneously transmits HARQ-ACK and CSI. That is, in case of collision between HARQ-ACK and CSI in a same sub-frame without PUSCH, if the first parameter is set at TRUE and if downlink control information that instructs transmission of a single PDSCH only on the primary cell is detected in PDCCH, CSI is multiplexed with HARQ-ACK on PUCCH.

That is, the mobile station device transmits HARQ-ACK and CSI by using the PUCCH format 2/2a/2b. Also, the mobile station device transmits HARQ-ACK and CSI by using the n(2)PUCCH resource. Herein, HARQ-ACK that is transmitted by the mobile station device includes HARQ-ACK corresponding to a single cell (the primary cell). Also, CSI that is transmitted by the mobile station device includes CSI corresponding to a single cell (the primary cell or the secondary cell).

Also, for example, the mobile station device, which has received the first parameter set at TRUE and the second parameter set at FALSE, transmits HARQ-ACK and/or CSI according to the second parameter if the mobile station device detects, in PDSCH, downlink control information that instructs transmission of a single PDSCH on the secondary cell (or transmission of PDSCH on at least a single secondary cell).

That is, the mobile station device drops CSI and transmits only HARQ-ACK. That is, the mobile station device transmits HARQ-ACK by using the PUCCH format 3. Also, the mobile station device transmits HARQ-ACK by using the n(3)PUCCH resource. Herein, HARQ-ACK that is transmitted by the mobile station device includes HARQ-ACK corresponding to a single cell or multiple cells. Also, CSI that is dropped by the mobile station device includes CSI corresponding to a single cell or multiple cells.

Also, for example, the mobile station device, which has received the first parameter set at FALSE and the second parameter set at TRUE, transmits HARQ-ACK and/or CSI according to the first parameter if the mobile station device detects, in PDCCH, downlink control information that instructs transmission of a single PDSCH only on the primary cell.

That is, the mobile station device drops CSI and transmits only HARQ-ACK. That is, the mobile station device transmits only HARQ-ACK by using the PUCCH format 1a/1b. Also, the mobile station device transmits only HARQ-ACK by using the n(1)PUCCH resource. Herein, HARQ-ACK that is transmitted by the mobile station device includes HARQ-ACK corresponding to a single cell (the primary cell). Also, CSI that is dropped by the mobile station device includes CSI corresponding to a single cell (the primary cell or the secondary cell).

Also, for example, the mobile station device, which has received the first parameter set at FALSE and the second parameter set at TRUE, transmits HARQ-ACK and/or CSI according to the second parameter if the mobile station device detects, in PDCCH, downlink control information that instructs transmission of a single PDSCH on the secondary cell (or transmission of PDSCH on at least a single secondary cell).

That is, the mobile station device simultaneously transmits HARQ-ACK and CSI. That is, in case of collision between HARQ-ACK and CSI in a same sub-frame without PUSCH, if the second parameter is set at TRUE and if downlink control information that instructs transmission of a single PDSCH on the secondary cell (or transmission of PDSCH on at least a single secondary cell) is detected, CSI is multiplexed with HARQ-ACK on PUCCH.

That is, the mobile station device transmits HARQ-ACK and CSI by using the PUCCH format 3. Also, the mobile station device transmits HARQ-ACK and CSI by using the n(3)PUCCH resource. Herein, HARQ-ACK that is transmitted by the mobile station device includes HARQ-ACK corresponding to a single cell or multiple cells. Also, CSI that is transmitted by the mobile station device includes CSI corresponding to a single cell or multiple cells.

Also, for example, the mobile station device, which has received the first parameter set at TRUE and the second parameter set at TRUE, transmits HARQ-ACK and/or CSI according to the first parameter if the mobile station device detects, in PDCCH, downlink control information that instructs transmission of a single PDSCH only on the primary cell.

That is, the mobile station device simultaneously transmits HARQ-ACK and CSI. That is, in case of collision between HARQ-ACK and CSI in a same sub-frame without PUSCH, if the first parameter is set at TRUE and if downlink control information that instructs transmission of a single PDSCH only on the primary cell is detected in PDCCH, CSI is multiplexed with HARQ-ACK on PUCCH.

That is, the mobile station device transmits HARQ-ACK and CSI by using the PUCCH format 2/2a/2b. Also, the mobile station device transmits HARQ-ACK and CSI by using the n(2)PUCCH resource. Herein, HARQ-ACK that is transmitted by the mobile station device includes HARQ-ACK corresponding to a single cell (the primary cell). Also, CSI that is transmitted by the mobile station device includes CSI corresponding to a single cell (the primary cell or the secondary cell).

Also, for example, the mobile station device, which has received the first parameter set at TRUE and the second parameter set at TRUE, transmits HARQ-ACK and/or CSI according to the second parameter if the mobile station device detects, in PDCCH, downlink control information that instructs transmission of a single PDSCH on the secondary cell (or transmission of PDSCH on at least a single secondary cell).

That is, the mobile station device simultaneously transmits HARQ-ACK and CSI. That is, in case of collision between HARQ-ACK and CSI in a same sub-frame without PUSCH, if the second parameter is set at TRUE and if downlink control information that instructs transmission of a single PDSCH on the secondary cell (or transmission of PDSCH on at least a single secondary cell) is detected in PDCCH, CSI is multiplexed with HARQ-ACK on PUCCH.

That is, the mobile station device transmits HARQ-ACK and CSI by using the PUCCH format 3. Also, the mobile station device transmits HARQ-ACK and CSI by using the n(3)PUCCH resource. Herein, HARQ-ACK that is transmitted by the mobile station device includes HARQ-ACK corresponding to a single cell or multiple cells. Also, CSI that is transmitted by the mobile station device includes CSI corresponding to a single cell or multiple cells.

FIG. 7 is still another illustration explaining this embodiment. FIG. 7 shows a transmission method of HARQ-ACK and/or CSI by the mobile station device, which has received the first parameter set at TRUE or FALSE and the second parameter set at TRUE or FALSE. Herein, FIG. 7 shows a transmission method of HARQ-ACK and/or CSI when simultaneous transmission of PUCCH and PUSCH is set (the third parameter is set at TRUE) and PUSCH (PUSCH resource) is scheduled. That is, FIG. 7 shows a transmission method of HARQ-ACK and/or CSI by the mobile station device, in which simultaneous transmission of PUCCH and PUSCH is set.

Hereinafter, described with explanation in FIG. 7 is a transmission method of HARQ-ACK and/or CSI by the mobile station device in a sub-frame in which HARQ-ACK (transmission of HARQ-ACK) and CSI (transmission of CSI) collide with each other (simultaneously occur). Herein, in the explanation in FIG. 7, the sub-frame in which HARQ-ACK and CSI collide with each other represents a sub-frame with PUSCH (sub-frame in which transmission on PUSCH is performed).

As shown in FIG. 7, for example, the mobile station device, which has received the first parameter set at FALSE and the second parameter set at FALSE, transmits HARQ-ACK on PUCCH and CSI on PUSCH if the mobile station device transmits HARQ-ACK corresponding to transmission of a single PDSCH only on the primary cell is transmitted.

Similarly, the mobile station device, which has received the first parameter (the first parameter set at FALSE or TRUE) and the second parameter (the second parameter set at FALSE or TRUE), transmits HARQ-ACK on PUCCH and CSI on PUSCH if the mobile station device transmits HARQ-ACK corresponding to transmission of a single PDSCH only on the primary cell.

That is, in case of collision between HARQ-ACK and CSI in a same sub-frame with PUSCH, the mobile station device, in which simultaneous transmission of PUCCH and PUSCH is set, transmits HARQ-ACK on PUCCH and CSI on PUSCH if HARQ-ACK corresponds to transmission of a single PDSCH only on the primary cell.

Herein, the mobile station device transmits HARQ-ACK by using the PUCCH format 1a/1b. Also, the mobile station device transmits HARQ-ACK by using the n(1)PUCCH resource. Herein, HARQ-ACK that is transmitted by the mobile station device includes HARQ-ACK corresponding to a single cell (the primary cell). Also, CSI that is transmitted by the mobile station device includes CSI corresponding to a single cell (the primary cell or the secondary cell). Also, the mobile station device can transmit CSI together with uplink data (transport block for UL-SCH) by using the PUSCH resource.

Also, for example, the mobile station device, which has received the first parameter set at FALSE and the second parameter set at FALSE, transmits HARQ-ACK on PUCCH and CSI on PUSCH if the mobile station device transmits HARQ-ACK corresponding to transmission of a single PDSCH on the secondary cell (or transmission of PDSCH on at least a single secondary cell).

Similarly, the mobile station device, which has received the first parameter set at TRUE and the second parameter set at FALSE, transmits HARQ-ACK on PUCCH and CSI on PUSCH if the mobile station device transmits HARQ-ACK corresponding to transmission of a single PDSCH on the secondary cell (or transmission of PDSCH on at least a single secondary cell).

That is, in case of collision between HARQ-ACK and CSI in a same sub-frame with PUSCH, if the second parameter is set at FALSE and if HARQ-ACK corresponds to transmission of a single PDSCH on the secondary cell (or transmission of PDSCH on at least a single secondary cell), the mobile station device, in which simultaneous transmission of PUCCH and PUSCH is set, transmits HARQ-ACK on PUCCH and CSI on PUSCH.

Herein, the mobile station device transmits HARQ-ACK by using the PUCCH format 3. Also, the mobile station device transmits HARQ-ACK by using the n(3)PUCCH resource. Herein, HARQ-ACK that is transmitted by the mobile station device includes HARQ-ACK corresponding to a single cell or multiple cells. Also, CSI that is transmitted by the mobile station device includes CSI corresponding to a single cell or multiple cells. Also, the mobile station device can transmit CSI together with uplink data (transport block for UL-SCH) by using the PUSCH resource.

Also, for example, the mobile station device, which has received the first parameter set at FALSE and the second parameter set at TRUE, transmits HARQ-ACK and CSI on PUCCH if the mobile station device transmits HARQ-ACK corresponding to transmission of a single PDSCH on the secondary cell (or transmission of PDSCH on at least a single secondary cell).

Also, for example, the mobile station device, which has received the first parameter set at TRUE and the second parameter set at TRUE, transmits HARQ-ACK and CSI on PUCCH if the mobile station device transmits HARQ-ACK corresponding to transmission of a single PDSCH on the secondary cell (or transmission of PDSCH on at least a single secondary cell).

That is, in case of collision between HARQ-ACK and CSI in a same sub-frame with PUSCH, if the second parameter is set at TRUE and if HARQ-ACK corresponds to transmission of a single PDSCH on the secondary cell (or transmission of PDSCH on at least a single secondary cell), the mobile station device, in which simultaneous transmission of PUCCH and PUSCH is set, transmits HARQ-ACK and CSI on PUCCH (CSI is multiplexed with HARQ-ACK and PUCCH).

Herein, the mobile station device transmits HARQ-ACK and CSI by using the PUCCH format 3. Also, the mobile station device transmits HARQ-ACK by using the n(3) PUCCH resource. Herein, HARQ-ACK that is transmitted by the mobile station device includes HARQ-ACK corresponding to a single cell or multiple cells. Also, CSI that is transmitted by the mobile station device includes CSI corresponding to a single cell or multiple cells. Also, the mobile station device can transmit HARQ-ACK and CSI on PUCCH, and uplink data (transport block for UL-SCH) on PUSCH (by using the PUSCH resource).

That is, the mobile station device, in which simultaneous transmission of PUCCH and PUSCH is set, determines whether the mobile station device transmits CSI on PUSCH or on PUCCH according to the second parameter if the mobile station device transmits HARQ-ACK corresponding to transmission of a single PDSCH on the secondary cell (or transmission of PDSCH on at least a single secondary cell).

Also, in FIG. 7, for example, the mobile station device, which has received the first parameter set at FALSE and the second parameter set at FALSE, may transmit HARQ-ACK on PUCCH and CSI on PUSCH if the mobile station device detects, in a single PDCCH, downlink control information that instructs transmission of a single PDSCH only on the primary cell.

Similarly, the mobile station device, which has received the first parameter (the first parameter set at FALSE or TRUE) and the second parameter (the second parameter set at FALSE or TRUE), transmits HARQ-ACK on PUCCH and CSI on PUSCH if the mobile station device detects, in a single PDCCH, downlink control information that instructs transmission of a single PDSCH only on the primary cell.

That is, in case of collision between HARQ-ACK and CSI in a same sub-frame with PUSCH, the mobile station device, in which simultaneous transmission of PUCCH and PUSCH is set, transmits HARQ-ACK on PUCCH and CSI on PUSCH if the mobile station device detects, in a single PDCCH, downlink control information that instructs transmission of a single PUSCH only on the primary cell.

Herein, the mobile station device transmits HARQ-ACK by using the PUCCH format 1a/1b. Also, the mobile station device transmits HARQ-ACK by using the n(1)PUCCH resource. Herein, HARQ-ACK that is transmitted by the mobile station device includes HARQ-ACK corresponding to a single cell (the primary cell). Also, CSI that is transmitted by the mobile station device includes CSI corresponding to a single cell (the primary cell or the secondary cell). Also, the mobile station device can transmit CSI together with uplink data (transport block for UL-SCH) by using the PUSCH resource.

Also, for example, the mobile station device, which has received the first parameter set at FALSE and the second parameter set at FALSE, transmits HARQ-ACK on PUCCH and CSI on PUSCH if the mobile station device detects, in a single PDCCH, downlink control information that instructs transmission of a single PDSCH on the secondary cell (or transmission of PDSCH on at least a single secondary cell).

Also, for example, the mobile station device, which has received the first parameter set at TRUE and the second parameter set at FALSE, transmits HARQ-ACK on PUCCH and CSI on PUSCH if the mobile station device detects, in a single PDSCH, downlink control information that instructs transmission of a single PDSCH on the secondary cell (or transmission of PDSCH on at least a single secondary cell).

That is, in case of collision between HARQ-ACK and CSI in a same sub-frame with PUSCH, if the second parameter is set at FALSE and if downlink control information that instructs transmission of a single PDSCH on the secondary cell (or transmission of PDSCH on at least a single secondary cell) is detected, the mobile station device, in which simultaneous transmission of PUCCH and PUSCH is set, transmits HARQ-ACK on PUCCH and CSI on PUSCH.

Herein, the mobile station device transmits HARQ-ACK by using the PUCCH format 3. Also, the mobile station device transmits HARQ-ACK by using the n(3)PUCCH resource. Herein, HARQ-ACK that is transmitted by the mobile station device includes HARQ-ACK corresponding to a single cell or multiple cells. Also, CSI that is transmitted by the mobile station device includes CSI corresponding to a single cell or multiple cells. Also, the mobile station device can transmit CSI together with uplink data (transport block for UL-SCH) by using the PUSCH resource.

Also, for example, the mobile station device, which has received the first parameter set at FALSE and the second parameter set at TRUE, transmits HARQ-ACK and CSI on PUCCH if the mobile station device detects, in a single PDCCH, downlink control information that instructs transmission of a single PDSCH on the secondary cell (or transmission of PDSCH on at least a single secondary cell).

Similarly, for example, the mobile station device, which has received the first parameter set at TRUE and the second parameter set at TRUE, transmits HARQ-ACK and CSI on PUCCH if the mobile station device detects, in a single PDCCH, downlink control information that instructs transmission of a single PDSCH on the secondary cell (or transmission of PDSCH on at least a single secondary cell).

That is, in case of collision between HARQ-ACK and CSI in a same sub-frame with PUSCH, if the second parameter is set at TRUE and if downlink control information that instructs transmission of a single PDSCH on the secondary cell (or transmission of PDSCH on at least a single secondary cell) is detected in a single PDCCH, the mobile station device, in which simultaneous transmission of PUCCH and PUSCH is set, transmits HARQ-ACK and CSI on PUCCH (CSI is multiplexed with HARQ-ACK on PUCCH).

Herein, the mobile station device transmits HARQ-ACK and CSI by using the PUCCH format 3. Also, the mobile station device transmits HARQ-ACK by using the n(3) PUCCH resource. Herein, HARQ-ACK that is transmitted by the mobile station device includes HARQ-ACK corresponding to a single cell or multiple cells. Also, CSI that is transmitted by the mobile station device includes CSI corresponding to a single cell or multiple cells. Also, the mobile station device can transmit HARQ-ACK and CSI on PUCCH, and uplink data (transport block for UL-SCH) by PUSCH (by using the PUSCH resource).

That is, the mobile station device, in which simultaneous transmission of PUCCH and PUSCH is set, determines whether the mobile station device transmits CSI on PUSCH or on PUCCH according to the second parameter if the mobile station device detects, in a single PDCCH, downlink control information that instructs transmission of a single PDSCH on the secondary cell (or transmission of PDSCH on at least a single secondary cell).

Since the mobile station device transmits HARQ-ACK and/or CSI as described above, the mobile station device can transmit HARQ-ACK and/or CSI by using a proper PUCCH format depending on the situation, and hence can efficiently transmit HARQ-ACK and/or CSI.

For example, in a situation in which the number of cells used for communication in the base station device differs from the number of cells used for communication in the mobile station device (when the base station device changes the number of cells used for communication by using the higher layer signal), the mobile station device can transmit HARQ-ACK by using the PUCCH format 1a/1b. That is, even if mismatch of the number of cells used for communication occurs between the base station device and the mobile station device, communication can be continued only on a single cell (the primary cell).

Also, for example, in a situation in which the number of cells used for communication in the base station device differs from the number of cells used for communication in the mobile station device (when the base station device changes the number of cells used for communication by using the higher layer signal), the mobile station device can simultaneously transmit HARQ-ACK and CSI by using the PUCCH format 2/2a/2b. That is, even if mismatch of the number of cells used for communication occurs between the base station device and the mobile station device, communication can be continued only on a single cell (the primary cell). Also, the base station device can perform efficient scheduling based on CSI.

Herein, basically, the PUCCH format 1a/1b and the PUCCH format 2/2a/2b each can transmit a smaller number of bits than that of the PUCCH format 3; however, the PUCCH format 1a/1b and the PUCCH format 2/2a/2b each can perform code multiplexing on a single physical resource block by a larger number than that of the PUCCH format 3. That is, in a situation in which the mobile station device transmits HARQ-ACK corresponding to a single cell (when HARQ-ACK corresponding to transmission of a single PDSCH on the primary cell is transmitted), by transmitting HARQ-ACK by using the PUCCH format 1a/1b or the PUCCH format 2/2a/2b, HARQ-ACK and CSI can be efficiently transmitted.

Also, if the mobile station device transmits HARQ-ACK corresponding to a single cell (HARQ-ACK with a small amount of information), the PUCCH format 1a/1b or the PUCCH format 2/2a/2b is used. If the mobile station device transmits HARQ-ACK corresponding to a single cell or multiple cells (HARQ-ACK with an amount thereof possibly becomes large), the PUCCH format 3 is used. Accordingly, HARQ-ACK and/or CSI can be efficiently transmitted by using a proper format depending on the situation.

Also, the error rate of ACK/NACK is desired to be further lower than that of CSI. That is, ACK/NACK that is transmitted with the PUCCH format 1a/1b has a lower error rate than that of ACK/NACK that is transmitted with the PUCCH format 2/2a/2b. That is, if only ACK/NACK is transmitted with the PUCCH format 3, the error rate of ACK/NACK is lower than the error rate of a case in which ACK/NACK and CSI are transmitted with the PUCCH format 3.

Also, when the mobile station device transmits HARQ-ACK corresponding to a single cell, since the mobile station device uses the PUCCH format 1a/1b or the PUCCH format 2/2a/2b according to the first parameter, the mobile station device can efficiently transmit HARQ-ACK and/or CSI by using a proper format.

Also, when the mobile station device transmits HARQ-ACK corresponding to a single cell or multiple cells, since the mobile station device uses the PUCCH format 3 according to the second parameter, the mobile station device can efficiently transmit only ACK/NACK, or ACK/NACK and CSI.

Also, since the base station device sets the second parameter because the mobile station device, in which simultaneous transmission of PUCCH and PUSCH is set, transmits HARQ-ACK and CSI as described above, the base station device can switch transmission between transmission on PUSCH and transmission on PUCCH. That is, information that instructs whether CSI is transmitted on PUSCH or PUCCH is not required, and hence HARQ-ACK and CSI can be efficiently transmitted.

Herein, basically, the information amount by which information can be transmitted on PUCCH is limited. Also, the information amount by which information can be transmitted on PUSCH is not limited. That is, PUCCH transmits information by only a small information amount whereas PUSCH transmits information by a large amount. Meanwhile, PUCCH is designed to be suitable for transmission of uplink control information (HARQ-ACK, CSI, scheduling request). For example, PUCCH is available for transmission with high electric power. Also, PUSCH is designed to be suitable for transmission of an uplink transport block.

That is, the base station device can switch transmission between transmission of CSI on PUSCH and transmission of CSI on PUCCH by using the second parameter depending on the situation. For example, if the base station device causes HARQ-ACK with a large information amount to be transmitted on PUCCH, the base station device can cause CSI to be transmitted on PUSCH. Also, if the base station device causes HARQ-ACK with a small information amount to be transmitted on PUCCH, the base station device can cause CSI to be transmitted on PUCCH.

Also, for example, if the base station device causes CSI with a large information amount to be transmitted, the base station device can cause CSI to be transmitted on PUSCH. Also, if the base station causes CSI with a small information amount to be transmitted, the base station device can cause CSI to be transmitted on PUCCH.

Also, for example, when it is desirable that the base station device correctly receives ACK/NACK, the base station device makes setting by using the third parameter so that the mobile station device transmits only ACK/NACK on PUCCH. Also, for example, when it is desirable that the base station device correctly receives CSI, the base station device makes setting by using the third parameter so that the mobile station device transmits ACK/NACK and CSI on PUCCH.

As described above, since the base station device changes the transmission method of HARQ-ACK and/or CSI depending on the situation, HARQ-ACK and/or CSI can be efficiently transmitted.

The above-described embodiment is also applied to an integrated circuit that is mounted on the base station device and/or the mobile station device. Also, in the above-described embodiment, the base station device or the mobile station device may be controlled by recording a program, which provides respective functions in the base station device or respective functions in the mobile station device, on a computer-readable recording medium, reading the program recorded on the recording medium by a computer system, and executing the program by the computer system. The "computer system" described herein includes OS and hardware such as a peripheral device.

Also, the "computer-readable recording medium" is a portable medium, such as a flexible disk, a magneto-optical disk, a ROM, or a CD-ROM; or a storage device, such as a hard disk embedded in the computer system. Further, the "computer-readable recording medium" includes a medium dynamically holding the program for a short period of time, such as a communication line when the program is transmitted through a network like the Internet or a telephone line; and a medium holding the program for a predetermined period of time, such as a volatile memory in the computer system, which may be a server or a client in this case. Also, the aforementioned program may provide part of the above-described functions, or may realize the above-described functions in combination with a program that is previously recorded in the computer system.

As described above, the present invention may employ aspects as described below. In particular, there is provided a mobile communication system according to the present invention, the mobile communication system which allows a base station device and a mobile station device to communicate with each other, in which the base station device transmits a first parameter relating to simultaneous transmission of HARQ-ACK and channel state information and a second parameter relating to simultaneous transmission of the HARQ-ACK and the channel state information to the mobile station device; if the mobile station device transmits the HARQ-ACK corresponding to transmission of a single physical downlink shared channel only on a primary cell, the mobile station device transmits the HARQ-ACK and/or the channel state information to the base station device according to the first parameter; and if the mobile station device transmits the HARQ-ACK corresponding to transmission of the single physical downlink shared channel on a secondary cell, the mobile station device transmits the HARQ-ACK and/or the channel state information to the base station device according to the second parameter.

Alternatively, there is provided a mobile communication system which allows a base station device and a mobile station device to communicate with each other, in which the base station device transmits a first parameter relating to simultaneous transmission of HARQ-ACK and channel state information and a second parameter relating to simultaneous transmission of the HARQ-ACK and the channel state information to the mobile station device; if the mobile station device transmits the HARQ-ACK corresponding to transmission of a single physical downlink shared channel only on a primary cell, the mobile station device transmits the HARQ-ACK and/or the channel state information to the base station device according to the first parameter; and if the mobile station device transmits the HARQ-ACK corresponding to transmission of the physical downlink shared channel on at least a single secondary cell, the mobile station device transmits the HARQ-ACK and/or the channel state information to the base station device according to the second parameter.

Alternatively, there is provided a mobile communication system which allows a base station device and a mobile station device to communicate with each other, in which the base station device transmits a first parameter relating to simultaneous transmission of HARQ-ACK and channel state information and a second parameter relating to simultaneous transmission of the HARQ-ACK and the channel state information to the mobile station device; if the mobile station device detects, in a single physical downlink control channel, downlink control information that instructs transmission of a single physical downlink shared channel only on a primary cell, the mobile station device transmits the HARQ-ACK and/or the channel state information to the base station device according to the first parameter; and if the mobile station device detects, in a single physical downlink control channel, downlink control information that instructs transmission of a single physical downlink shared channel on a secondary cell, the mobile station device transmits the HARQ-ACK and/or the channel state information to the base station device according to the second parameter.

Alternatively, there is provided a mobile communication system which allows a base station device and a mobile station device to communicate with each other, in which the base station device transmits a first parameter relating to simultaneous transmission of HARQ-ACK and channel state information and a second parameter relating to simultaneous transmission of the HARQ-ACK and the channel state information to the mobile station device; if the mobile station device detects, in a single physical downlink control channel, downlink control information that instructs transmission of a single physical downlink shared channel only on a primary cell, the mobile station device transmits the HARQ-ACK and/or the channel state information to the base station device according to the first parameter; and if the mobile station device detects, in a physical downlink control channel, downlink control information that instructs transmission of a physical downlink shared channel on at least a single secondary cell, the mobile station device transmits the HARQ-ACK and/or the channel state information to the base station device according to the second parameter.

Also, the HARQ-ACK includes information indicative of ACK/NACK for a downlink transport block.

Also, the HARQ-ACK includes information indicative of DTX.

Alternatively, there is provided a base station device that communicates with a mobile station device, in which the base station device transmits a first parameter relating to simultaneous transmission of HARQ-ACK and channel state information and a second parameter relating to simultaneous transmission of the HARQ-ACK and the channel state information to the mobile station device; if the mobile station device transmits the HARQ-ACK corresponding to transmission of a single physical downlink shared channel only on a primary cell, the base station device receives the HARQ-ACK and/or the channel state information from the mobile station device according to the first parameter; and if the mobile station device transmits the HARQ-ACK corresponding to transmission of the single physical downlink shared channel on a secondary cell, the base station device receives the HARQ-ACK and/or the channel state information from the mobile station device according to the second parameter.

Alternatively, there is provided a base station device that communicates with a mobile station device, in which the base station device transmits a first parameter relating to simultaneous transmission of HARQ-ACK and channel state information and a second parameter relating to simultaneous transmission of the HARQ-ACK and the channel state information to the mobile station device; if the mobile station device transmits the HARQ-ACK corresponding to transmission of a single physical downlink shared channel only on a primary cell, the base station device receives the HARQ-ACK and/or the channel state information from the mobile station device according to the first parameter; and if the mobile station device transmits the HARQ-ACK corresponding to transmission of the physical downlink shared channel on at least a single secondary cell, the base station device receives the HARQ-ACK and/or the channel state information from the mobile station device according to the second parameter.

Alternatively, there is provided a base station device that communicates with a mobile station device, in which the base station device transmits a first parameter relating to simultaneous transmission of HARQ-ACK and channel state information and a second parameter relating to simultaneous transmission of the HARQ-ACK and the channel state information to the mobile station device; if the mobile station device detects, in a single physical downlink control channel, downlink control information that instructs transmission of a single physical downlink shared channel only on a primary cell, the base station device receives the HARQ-ACK and/or the channel state information from the mobile station device according to the first parameter; and if the mobile station device detects, in a single physical downlink control channel, downlink control information that instructs transmission of a single physical downlink shared channel on a secondary cell, the base station device receives the HARQ-ACK and/or the channel state information from the mobile station device according to the second parameter.

Alternatively, there is provided a base station device that communicates with a mobile station device, in which the base station device transmits a first parameter relating to simultaneous transmission of HARQ-ACK and channel state information and a second parameter relating to simultaneous transmission of the HARQ-ACK and the channel state information to the mobile station device; if the mobile station device detects, in a single physical downlink control channel, downlink control information that instructs transmission of a single physical downlink shared channel only on a primary cell, the base station device receives the HARQ-ACK and/or the channel state information from the mobile station device according to the first parameter; and if the mobile station device detects, in a physical downlink control channel, downlink control information that instructs transmission of a physical downlink shared channel on at least a single secondary cell, the base station device receives the HARQ-ACK and/or the channel state information from the mobile station device according to the second parameter.

Also, the HARQ-ACK includes information indicative of ACK/NACK for a downlink transport block.

Also, the HARQ-ACK includes information indicative of DTX.

Alternatively, there is provided a mobile station device that communicates with a base station device, in which the mobile station device receives a first parameter relating to simultaneous transmission of HARQ-ACK and channel state information and a second parameter relating to simultaneous transmission of the HARQ-ACK and the channel state information from the base station device; if the mobile station device transmits the HARQ-ACK corresponding to transmission of a single physical downlink shared channel only on a primary cell, the mobile station device transmits the HARQ-ACK and/or the channel state information to the base station device according to the first parameter; and if the mobile station device transmits the HARQ-ACK corresponding to transmission of the single physical downlink shared channel on a secondary cell, the mobile station device transmits the HARQ-ACK and/or the channel state information to the base station device according to the second parameter.

Alternatively, there is provided a mobile station device that communicates with a base station device, in which the mobile station device receives a first parameter relating to simultaneous transmission of HARQ-ACK and channel state information and a second parameter relating to simultaneous transmission of the HARQ-ACK and the channel state information from the base station device; if the mobile station device transmits the HARQ-ACK corresponding to transmission of a single physical downlink shared channel only on a primary cell, the mobile station device transmits the HARQ-ACK and/or the channel state information to the base station device according to the first parameter; and if the mobile station device transmits the HARQ-ACK corresponding to transmission of the physical downlink shared channel on at least a single secondary cell, the mobile station device transmits the HARQ-ACK and/or the channel state information to the base station device according to the second parameter.

Alternatively, there is provided a mobile station device that communicates with a base station device, in which the mobile station device receives a first parameter relating to simultaneous transmission of HARQ-ACK and channel state information and a second parameter relating to simultaneous transmission of the HARQ-ACK and the channel state information from the base station device; if the mobile station device detects, in a single physical downlink control channel, downlink control information that instructs transmission of a single physical downlink shared channel only on a primary cell, the mobile station device transmits the HARQ-ACK and/or the channel state information to the base station device according to the first parameter; and if the mobile station device detects, in a single physical downlink control channel, downlink control information that instructs transmission of a single physical downlink shared channel on a secondary cell, the mobile station device transmits the HARQ-ACK and/or the channel state information to the base station device according to the second parameter.

Alternatively, there is provided a mobile station device that communicates with a base station device, in which the mobile station device receives a first parameter relating to simultaneous transmission of HARQ-ACK and channel state information and a second parameter relating to simultaneous transmission of the HARQ-ACK and the channel state information from the base station device; if the mobile station device detects, in a single physical downlink control channel, downlink control information that instructs transmission of a single physical downlink shared channel only on a primary cell, the mobile station device transmits the HARQ-ACK and/or the channel state information to the base station device according to the first parameter; and if the mobile station device detects, in a physical downlink control channel, downlink control information that instructs transmission of a physical downlink shared channel on at least a single secondary cell, the mobile station device transmits the HARQ-ACK and/or the channel state information to the base station device according to the second parameter.

Also, the HARQ-ACK includes information indicative of ACK/NACK for a downlink transport block.

Also, the HARQ-ACK includes information indicative of DTX.

Alternatively, there is provided a communication method of a base station device that communicates with a mobile station device, including transmitting a first parameter relating to simultaneous transmission of HARQ-ACK and channel state information and a second parameter relating to simultaneous transmission of the HARQ-ACK and the channel state information to the mobile station device; if the mobile station device transmits the HARQ-ACK corresponding to transmission of a single physical downlink shared channel only on a primary cell, receiving the HARQ-ACK and/or the channel state information from the mobile station device according to the first parameter; and if the mobile station device transmits the HARQ-ACK corresponding to transmission of the single physical downlink shared channel on a secondary cell, receiving the HARQ-ACK and/or the channel state information from the mobile station device according to the second parameter.

Alternatively, there is provided a communication method of a base station device that communicates with a mobile station device, including transmitting a first parameter relating to simultaneous transmission of HARQ-ACK and channel state information and a second parameter relating to simultaneous transmission of the HARQ-ACK and the channel state information to the mobile station device; if the mobile station device transmits the HARQ-ACK corresponding to transmission of a single physical downlink shared channel only on a primary cell, receiving the HARQ-ACK and/or the channel state information from the mobile station device according to the first parameter; and if the mobile station device transmits the HARQ-ACK corresponding to transmission of the physical downlink shared channel on at least a single secondary cell, receiving the HARQ-ACK and/or the channel state information from the mobile station device according to the second parameter.

Alternatively, there is provided a communication method of a base station device that communicates with a mobile station device, including transmitting a first parameter relating to simultaneous transmission of HARQ-ACK and channel state information and a second parameter relating to simultaneous transmission of the HARQ-ACK and the channel state information to the mobile station device; if the mobile station device detects, in a single physical downlink control channel, downlink control information that instructs transmission of a single physical downlink shared channel only on a primary cell, receiving the HARQ-ACK and/or the channel state information from the mobile station device according to the first parameter; and if the mobile station device detects, in a single physical downlink control channel, downlink control information that instructs transmission of a single physical downlink shared channel on a secondary cell, receiving the HARQ-ACK and/or the channel state information from the mobile station device according to the second parameter.

Alternatively, there is provided a communication method of a base station device that communicates with a mobile station device, including transmitting a first parameter relating to simultaneous transmission of HARQ-ACK and channel state information and a second parameter relating to simultaneous transmission of the HARQ-ACK and the channel state information to the mobile station device; if the mobile station device detects, in a single physical downlink control channel, downlink control information that instructs transmission of a single physical downlink shared channel only on a primary cell, receiving the HARQ-ACK and/or the channel state information from the mobile station device according to the first parameter; and if the mobile station device detects, in a physical downlink control channel, downlink control information that instructs transmission of a physical downlink shared channel on at least a single secondary cell, receiving the HARQ-ACK and/or the channel state information from the mobile station device according to the second parameter.

Alternatively, there is provided a communication method of a mobile station device that communicates with a base station device, including receiving a first parameter relating to simultaneous transmission of HARQ-ACK and channel state information and a second parameter relating to simultaneous transmission of the HARQ-ACK and the channel state information from the base station device; if the mobile station device transmits the HARQ-ACK corresponding to transmission of a single physical downlink shared channel only on a primary cell, transmitting the HARQ-ACK and/or the channel state information to the base station device according to the first parameter; and if the mobile station device transmits the HARQ-ACK corresponding to transmission of the single physical downlink shared channel on a secondary cell, transmitting the HARQ-ACK and/or the channel state information to the base station device according to the second parameter.

Alternatively, there is provided a communication method of a mobile station device that communicates with a base station device, including receiving a first parameter relating to simultaneous transmission of HARQ-ACK and channel state information and a second parameter relating to simultaneous transmission of the HARQ-ACK and the channel state information from the base station device; if the mobile station device transmits the HARQ-ACK corresponding to transmission of a single physical downlink shared channel only on a primary cell, transmitting the HARQ-ACK and/or the channel state information to the base station device according to the first parameter; and if the mobile station device transmits the HARQ-ACK corresponding to transmission of the physical downlink shared channel on at least a single secondary cell, transmitting the HARQ-ACK and/or the channel state information to the base station device according to the second parameter.

Alternatively, there is provided a communication method of a mobile station device that communicates with a base station device, including receiving a first parameter relating to simultaneous transmission of HARQ-ACK and channel state information and a second parameter relating to simultaneous transmission of the HARQ-ACK and the channel state information from the base station device; if the mobile station device detects, in a single physical downlink control channel, downlink control information that instructs transmission of a single physical downlink shared channel only on a primary cell, transmitting the HARQ-ACK and/or the channel state information to the base station device according to the first parameter; and if the mobile station device detects, in a single physical downlink control channel, downlink control information that instructs transmission of a single physical downlink shared channel on a secondary cell, transmitting the HARQ-ACK and/or the channel state information to the base station device according to the second parameter.

Alternatively, there is provided a communication method of a mobile station device that communicates with a base station device, including receiving a first parameter relating to simultaneous transmission of HARQ-ACK and channel state information and a second parameter relating to simultaneous transmission of the HARQ-ACK and the channel state information from the base station device; if the mobile station device detects, in a single physical downlink control channel, downlink control information that instructs transmission of a single physical downlink shared channel only on a primary cell, transmitting the HARQ-ACK and/or the channel state information to the base station device according to the first parameter; and if the mobile station device detects, in a physical downlink control channel, downlink control information that instructs transmission of a physical downlink shared channel on at least a single secondary cell, transmitting the HARQ-ACK and/or the channel state information to the base station device according to the second parameter.

Alternatively, there is provided an integrated circuit that is mounted on a base station device, which communicates with a mobile station device, and that causes the base station device to execute processing, the processing including processing of transmitting a first parameter relating to simultaneous transmission of HARQ-ACK and channel state information and a second parameter relating to simultaneous transmission of the HARQ-ACK and the channel state information to the mobile station device; if the mobile station device transmits the HARQ-ACK corresponding to transmission of a single physical downlink shared channel only on a primary cell, processing of receiving the HARQ-ACK and/or the channel state information from the mobile station device according to the first parameter; and if the mobile station device transmits the HARQ-ACK corresponding to transmission of the single physical downlink shared channel on a secondary cell, processing of receiving the HARQ-ACK and/or the channel state information from the mobile station device according to the second parameter.

Alternatively, there is provided an integrated circuit that is mounted on a base station device, which communicates with a mobile station device, and that causes the base station device to execute processing, the processing including processing of transmitting a first parameter relating to simultaneous transmission of HARQ-ACK and channel state information and a second parameter relating to simultaneous transmission of the HARQ-ACK and the channel state information to the mobile station device; if the mobile station device transmits the HARQ-ACK corresponding to transmission of a single physical downlink shared channel only on a primary cell, processing of receiving the HARQ-ACK and/or the channel state information from the mobile station device according to the first parameter; and if the mobile station device transmits the HARQ-ACK corresponding to transmission of the physical downlink shared channel on at least a single secondary cell, processing of receiving the HARQ-ACK and/or the channel state information from the mobile station device according to the second parameter.

Alternatively, there is provided an integrated circuit that is mounted on a base station device, which communicates with a mobile station device, and that causes the base station device to execute processing, the processing including processing of transmitting a first parameter relating to simultaneous transmission of HARQ-ACK and channel state information and a second parameter relating to simultaneous transmission of the HARQ-ACK and the channel state information to the mobile station device; if the mobile station device detects, in a single physical downlink control channel, downlink control information that instructs transmission of a single physical downlink shared channel only on a primary cell, processing of receiving the HARQ-ACK and/or the channel state information from the mobile station device according to the first parameter; and if the mobile station device detects, in a single physical downlink control channel, downlink control information that instructs transmission of a single physical downlink shared channel on a secondary cell, processing of receiving the HARQ-ACK and/or the channel state information from the mobile station device according to the second parameter.

Alternatively, there is provided an integrated circuit that is mounted on a base station device, which communicates with a mobile station device, and that causes the base station device to execute processing, the processing including processing of transmitting a first parameter relating to simultaneous transmission of HARQ-ACK and channel state information and a second parameter relating to simultaneous transmission of the HARQ-ACK and the channel state information to the mobile station device; if the mobile station device detects, in a single physical downlink control channel, downlink control information that instructs transmission of a single physical downlink shared channel only on a primary cell, processing of receiving the HARQ-ACK and/or the channel state information from the mobile station device according to the first parameter; and if the mobile station device detects, in a physical downlink control channel, downlink control information that instructs transmission of a physical downlink shared channel on at least a single secondary cell, processing of receiving the HARQ-ACK and/or the channel state information from the mobile station device according to the second parameter.

Alternatively, there is provided an integrated circuit that is mounted on a mobile station device, which communicates with a base station device, and that causes the mobile station device to execute processing, the processing including processing of receiving a first parameter relating to simultaneous transmission of HARQ-ACK and channel state information and a second parameter relating to simultaneous transmission of the HARQ-ACK and the channel state information from the base station device; if the mobile station device transmits the HARQ-ACK corresponding to transmission of a single physical downlink shared channel only on a primary cell, processing of transmitting the HARQ-ACK and/or the channel state information to the base station device according to the first parameter; and if the mobile station device transmits the HARQ-ACK corresponding to transmission of the single physical downlink shared channel on a secondary cell, processing of transmitting the HARQ-ACK and/or the channel state information to the base station device according to the second parameter.

Alternatively, there is provided an integrated circuit that is mounted on a mobile station device, which communicates with a base station device, and that causes the mobile station device to execute processing, the processing including processing of receiving a first parameter relating to simultaneous transmission of HARQ-ACK and channel state information and a second parameter relating to simultaneous transmission of the HARQ-ACK and the channel state information from the base station device; if the mobile station device transmits the HARQ-ACK corresponding to transmission of a single physical downlink shared channel only on a primary cell, processing of transmitting the HARQ-ACK and/or the channel state information to the base station device according to the first parameter; and if the mobile station device transmits the HARQ-ACK corresponding to transmission of the physical downlink shared channel on at least a single secondary cell, processing of transmitting the HARQ-ACK and/or the channel state information to the base station device according to the second parameter.

Alternatively, there is provided an integrated circuit that is mounted on a mobile station device, which communicates with a base station device, and that causes the mobile station device to execute processing, the processing including processing of receiving a first parameter relating to simultaneous transmission of HARQ-ACK and channel state information and a second parameter relating to simultaneous transmission of the HARQ-ACK and the channel state information from the base station device; if the mobile station device detects, in a single physical downlink control channel, downlink control information that instructs transmission of a single physical downlink shared channel only on a primary cell, processing of transmitting the HARQ-ACK and/or the channel state information to the base station device according to the first parameter; and if the mobile station device detects, in a single physical downlink control channel, downlink control information that instructs transmission of a single physical downlink shared channel on a secondary cell, processing of transmitting the HARQ-ACK and/or the channel state information to the base station device according to the second parameter.

Alternatively, there is provided an integrated circuit that is mounted on a mobile station device, which communicates with a base station device, and that causes the mobile station device to execute processing, the processing including processing of receiving a first parameter relating to simultaneous transmission of HARQ-ACK and channel state information and a second parameter relating to simultaneous transmission of the HARQ-ACK and the channel state information from the base station device; if the mobile station device detects, in a single physical downlink control channel, downlink control information that instructs transmission of a single physical downlink shared channel only on a primary cell, processing of transmitting the HARQ-ACK and/or the channel state information to the base station device according to the first parameter; and if the mobile station device detects, in a physical downlink control channel, downlink control information that instructs transmission of a physical downlink shared channel on at least a single secondary cell, processing of transmitting the HARQ-ACK and/or the channel state information to the base station device according to the second parameter.

The embodiment of the invention has been described above with reference to the drawings. However, the specific configuration is not limited to this embodiment, and the claims may include design etc. within the scope of the invention.

REFERENCE SIGNS LIST 100 base station device
101 data control unit
102 transmission data modulating unit
103 radio unit
104 scheduling unit
105 channel estimating unit
106 reception data demodulating unit
107 data extracting unit
108 higher layer
109 antenna
110 radio resource control unit
200 mobile station device
201 data control unit
202 transmission data modulating unit
203 radio unit
204 scheduling unit
205 channel estimating unit
206 reception data demodulating unit
207 data extracting unit
208 higher layer
209 antenna
210 radio resource control unit

The invention claimed is:

1. A mobile station device that communicates with a base station device using a plurality of serving cells, wherein the plurality of serving cells includes a primary cell and at least one secondary cell, the mobile station device comprising:
a receiving unit configured to:
receive a first parameter that is used for allowing simultaneous transmission of Hybrid Automatic Repeat Request (HARQ) control information and channel state information;
receive a second parameter that is used for allowing simultaneous transmission of the HARQ control information and the channel state information using a second physical uplink control channel format; and
a determining unit configured to determine whether
the channel state information multiplexed with the HARQ control information is transmitted using a first physical uplink control channel format,
the channel state information multiplexed with the HARQ control is transmitted using the second physical uplink control channel format, or
the channel state information is dropped,
with the reference to the first parameter, the second parameter, and whether or not a single physical downlink shared channel transmission only on the primary cell indicated by a detection of a physical downlink control channel is received,
in a case of collision between the HARQ control information and the channel state information in a same sub-frame without a physical uplink shared channel.

2. The mobile station device according to claim 1, wherein
in the case of collision between the HARQ control information and the channel state information in the sub-frame without the physical uplink shared channel,
if the simultaneous transmission of the HARQ control information and the channel state information is allowed using the first parameter and if the single physical downlink shared channel transmission only on the primary cell indicated by the detection of the physical downlink control channel is received,
the channel state information multiplexed with the HARQ control information is transmitted using the first physical uplink control channel format.

3. The mobile station device according to claim 1, wherein
in the case of collision between the HARQ control information and the channel state information in the sub-frame without the physical uplink shared channel,
if the simultaneous transmission of the HARQ control information and the channel state information using the second physical uplink control channel format is allowed using the second parameter,
the channel state information multiplexed with the HARQ control information is transmitted using the second physical uplink control channel format.

4. The mobile station device according to claim 1, wherein
in the case of the collision between the HARQ control information and the channel state information in the sub-frame without the physical uplink shared channel,
if the simultaneous transmission of the HARQ control information and the channel state information is not allowed the first parameter and if the simultaneous transmission of the HARQ control information and the channel state information using the second physical uplink control channel format is not allowed using the second parameter,
the channel state information is dropped.

5. The mobile station device according to claim 1, wherein a resource for the first physical uplink control information format is set by a higher layer.

6. The mobile station device according to claim 1, wherein a resource for the second physical uplink control information format is indicated using downlink control information that is transmitted on the physical downlink control channel, the downlink control information being used for indicating the resource for the second physical uplink control information format from four resources set by the higher layer.

7. The mobile station device according to claim 1, wherein the HARQ control information includes information indicative of a positive acknowledgment (ACK) or a negative acknowledgment (NACK).

8. The mobile station device according to claim 1, wherein the channel state information includes channel state information that is periodically transmitted.

9. The mobile station device according to claim 1, wherein
the first physical uplink control channel format includes a physical uplink control channel format that is possible to transmit coded bits of 20 bits per sub-frame.

10. The mobile station device according to claim 1, wherein
the first physical uplink control channel format includes a physical uplink control information format that is possible to transmit the channel state information multiplexed with the HARQ-ACK of 1 bit.

11. The mobile station device according to claim 1, wherein
the first physical uplink control channel format includes a physical uplink control channel format that is possible to transmit coded bits of 21 bits per sub-frame.

12. The mobile station device according to claim 1, wherein
the first physical uplink control channel format includes a physical uplink control information format that is possible to transmit the channel state information multiplexed with the HARQ-ACK of 2 bits.

13. The mobile station device according to claim 1, wherein
the first physical uplink control channel format includes a physical uplink control channel format that is possible to transmit coded bits of 22 bits per sub-frame.

14. The mobile station device according to claim 1, wherein
the second physical uplink control channel format includes a physical uplink control channel format that is possible to transmit coded bits of 48 bits per sub-frame.

15. The mobile station device according to claim 1, wherein
the second physical uplink control channel format includes a physical uplink control channel format that is possible to transmit uplink control information of 22 bits at maximum.

16. A method of a mobile station device that communicates with a base station device using a plurality of serving cells, wherein the plurality of serving cells includes a primary cell and at least one secondary cell, the method comprising:
receiving a first parameter that is used for allowing simultaneous transmission of Hybrid Automatic Repeat Request (HARQ) control information and channel state information;
receiving a second parameter that is used for allowing simultaneous transmission of the HARQ control information and the channel state information using a second physical uplink control channel format; and
determining whether
the channel state information multiplexed with the HARQ control information is transmitted using a first physical uplink control channel format,
the channel state information multiplexed with the relating HARQ control information is transmitted using the second physical uplink control channel format, or
the channel state information is dropped,
with reference to the first parameter, the second parameter, and whether or not a single physical downlink shared channel transmission only on the primary cell indicated by a detection of a physical downlink control channel is received,
in a case of collision between the HARQ control information and the channel state information in a same sub-frame without a physical uplink shared channel.

17. An integrated circuit that is mounted on a mobile station device which communicates with a base station device using a plurality of serving cells, wherein the plurality of serving cells includes a primary cell and at least one secondary cell, and that causes the mobile station device to execute processing, the processing comprising:
processing of receiving a first parameter that is used for allowing simultaneous transmission of Hybrid Automatic Repeat Request (HARQ) control information and channel state information;
processing of receiving a second parameter that is used for allowing simultaneous transmission of the HARQ control information and the channel state information using a second physical uplink control channel format; and
processing of determining whether
the channel state information multiplexed with the control information is transmitted using a first physical uplink control channel format,
the channel state information multiplexed with the HARQ control information is transmitted using the second physical uplink control channel format, or
the channel state information is dropped,
with reference to the first parameter, the second parameter, and whether or not a single physical downlink shared channel transmission only on the primary cell indicated by a detection of a physical downlink control channel is received,
in a case of collision between the HARQ control information and the channel state information in a same sub-frame without a physical uplink shared channel.

* * * * *